United States Patent
Hollins

(10) Patent No.: US 6,633,989 B1
(45) Date of Patent: Oct. 14, 2003

(54) METHOD AND MECHANISM FOR SYNCHRONIZING A SLAVE'S TIMER TO A MASTER'S TIMER

(75) Inventor: Jack B. Hollins, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/452,272

(22) Filed: Nov. 30, 1999

(51) Int. Cl.[7] .............................. G06F 1/12; G06F 1/04
(52) U.S. Cl. ..................... 713/400; 713/502; 713/600
(58) Field of Search .......................... 713/400, 500, 713/600, 502; 327/160

(56) References Cited

U.S. PATENT DOCUMENTS

| | | | | |
|---|---|---|---|---|
| 4,588,884 A | * | 5/1986 | Priscott | 250/223 R |
| 5,001,730 A | * | 3/1991 | Franaszek et al. | 375/356 |
| 5,442,773 A | * | 8/1995 | Oto | 713/400 |
| 5,555,383 A | * | 9/1996 | Elazar et al. | 710/126 |
| 5,577,235 A | * | 11/1996 | Mitra | 713/600 |
| 5,918,040 A | * | 6/1999 | Jarvis | 370/507 |
| 5,926,048 A | * | 7/1999 | Greatwood | 327/160 |
| 6,028,412 A | * | 2/2000 | Shine et al. | 318/696 |
| 6,047,382 A | * | 4/2000 | Maley et al. | 713/501 |
| 6,195,758 B1 | * | 2/2001 | Lundh et al. | 713/500 |

FOREIGN PATENT DOCUMENTS

| | | | |
|---|---|---|---|
| JP | 356065547 A | * | 6/1981 |
| JP | 401136441 A | * | 5/1989 |

OTHER PUBLICATIONS

*IEEE Standard for a High Performance Serial Bus*, IEEE Std. 1394–1995, Aug. 30, 1996, pp. 199–348.
International Standard CEI/IEC 61883–1:1998, pp. 3–83.
International Standard CEI/IEC 61883–4:1998, pp. 3–23.

* cited by examiner

Primary Examiner—Thomas Lee
Assistant Examiner—Chun Cao
(74) Attorney, Agent, or Firm—Christopher P. Maioriana, PC

(57) ABSTRACT

A circuit for synchronizing an internal time signal to an external time signal includes a first timer, a second timer, and a comparator. The first timer repetitively increments and outputs a first time signal. The second timer repetitively outputs a second time signal. The comparator drives an active comparator signal if the first time signal is greater than the second time signal, or otherwise an inactive signal. The first timer saves the second time signal as the first time signal in response to a control signal derived from the inactive comparator signal and repetitively increments and outputs the first time signal. Alternatively, the first timer freezes, i.e., preventing the repetitive incrementing, of the first time signal in response to a control signal derived from the active comparator signal. The second timer repetitively increments and outputs the second time signal in response to a control signal derived from the active comparator signal. When the first time signal becomes less than or equal to the second time signal, the first timer unfreezes the first time signal in response to a control signal derived from the inactive comparator signal.

23 Claims, 10 Drawing Sheets

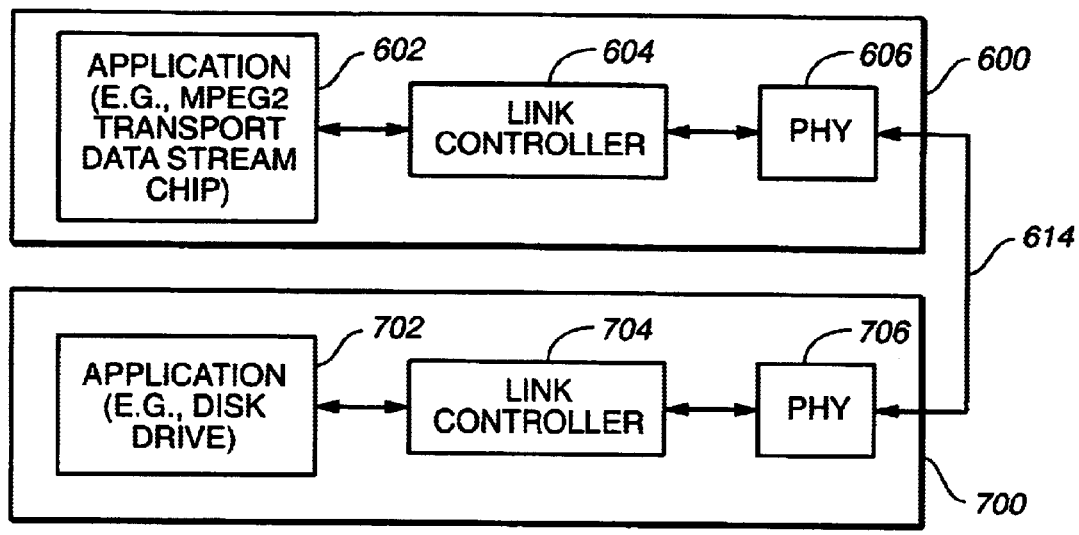
FIG._1A
*(PRIOR ART)*
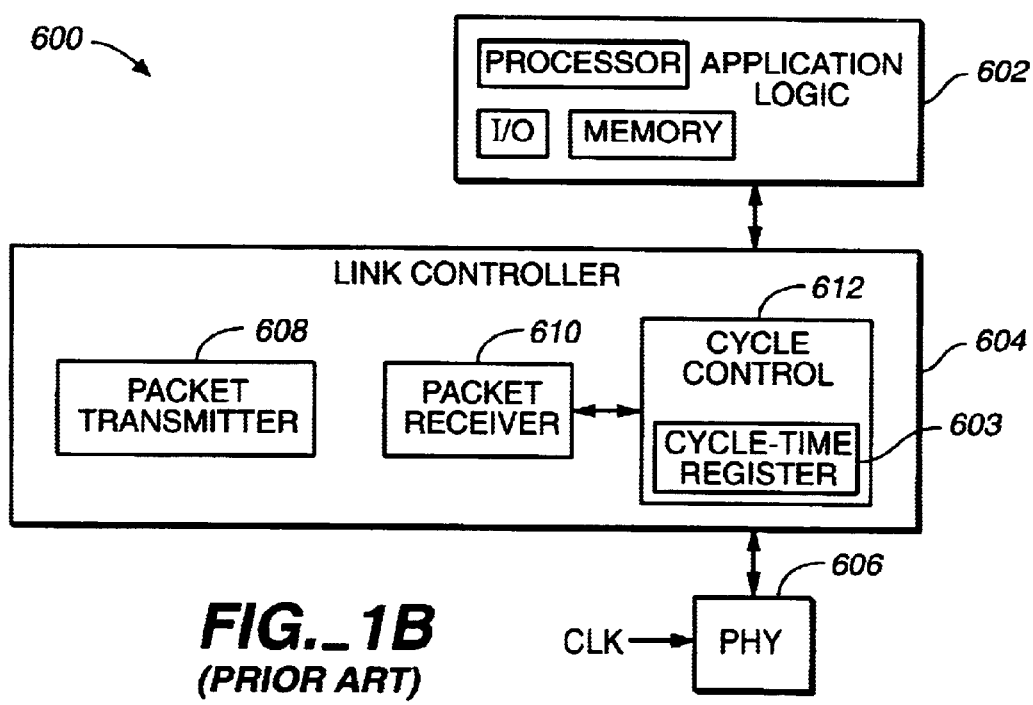
FIG._1B
*(PRIOR ART)*

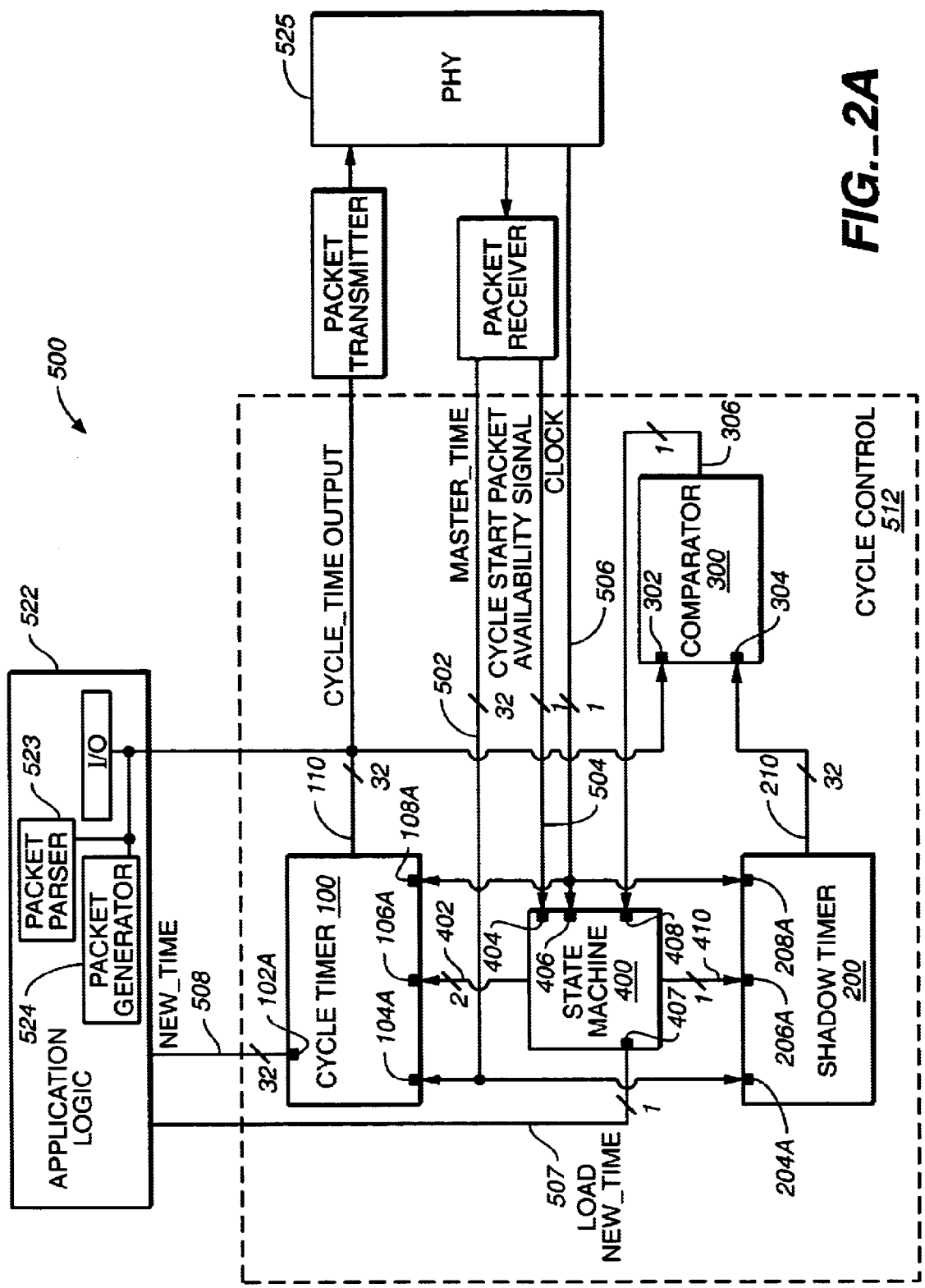
FIG._2A

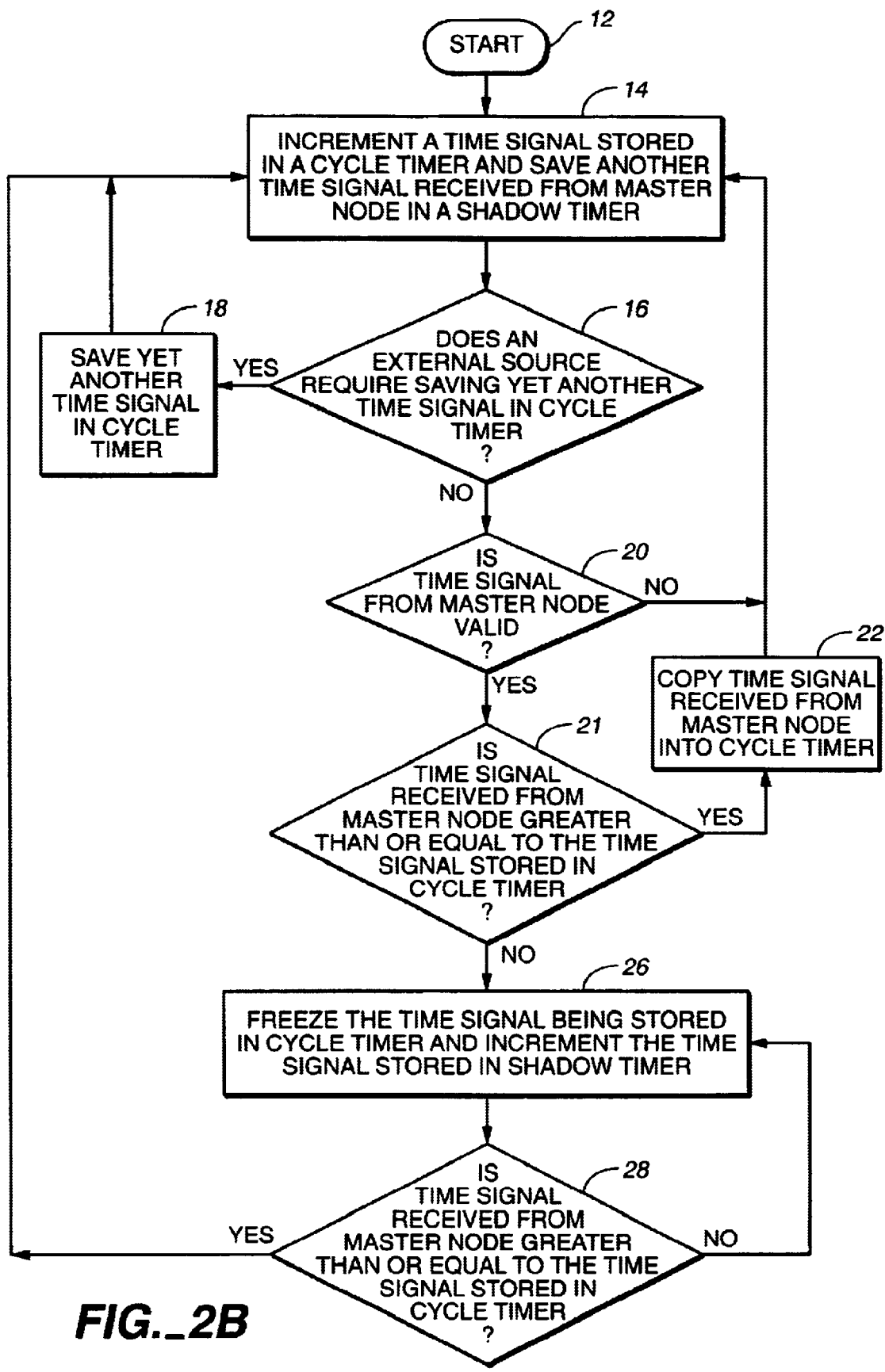
FIG._2B

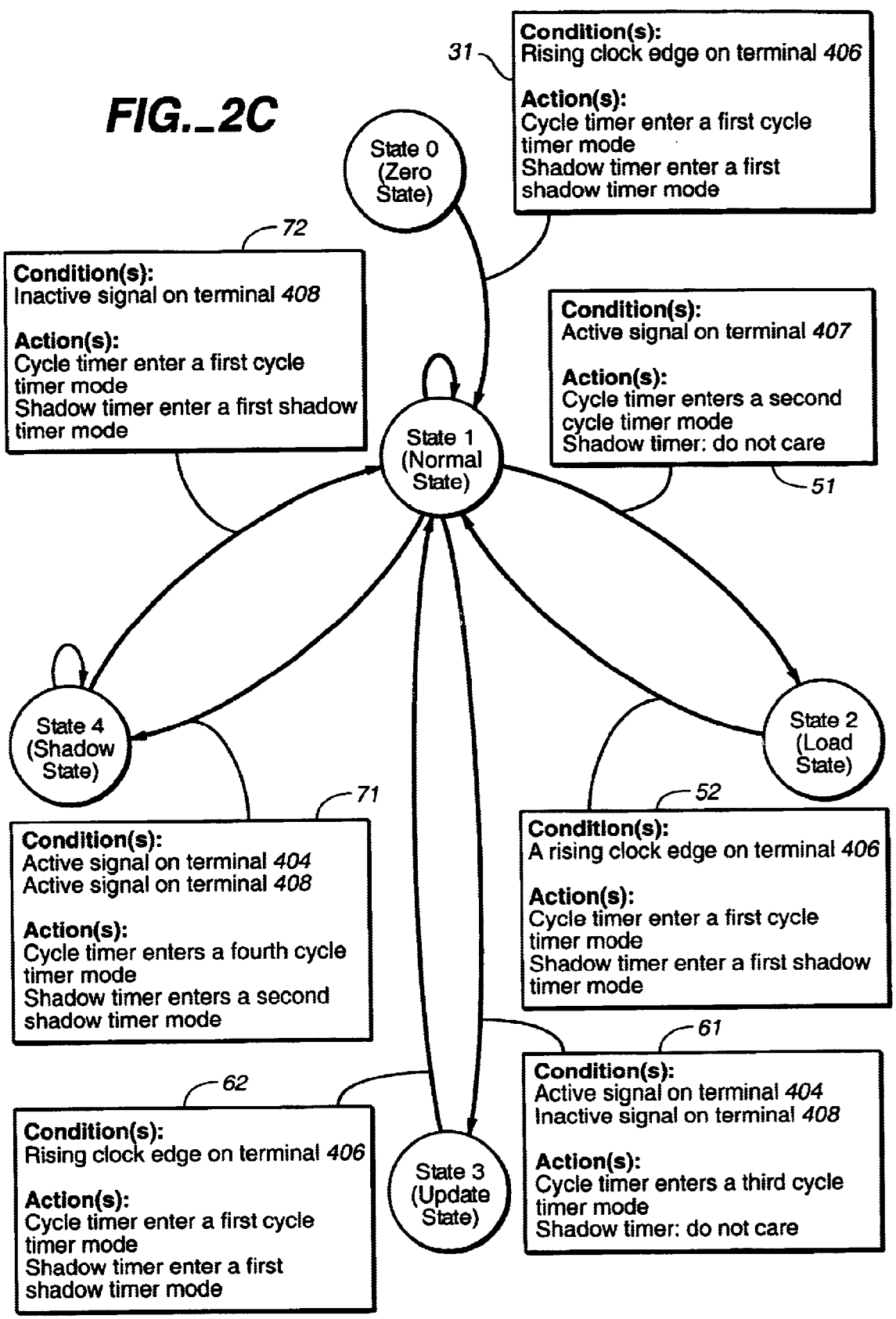

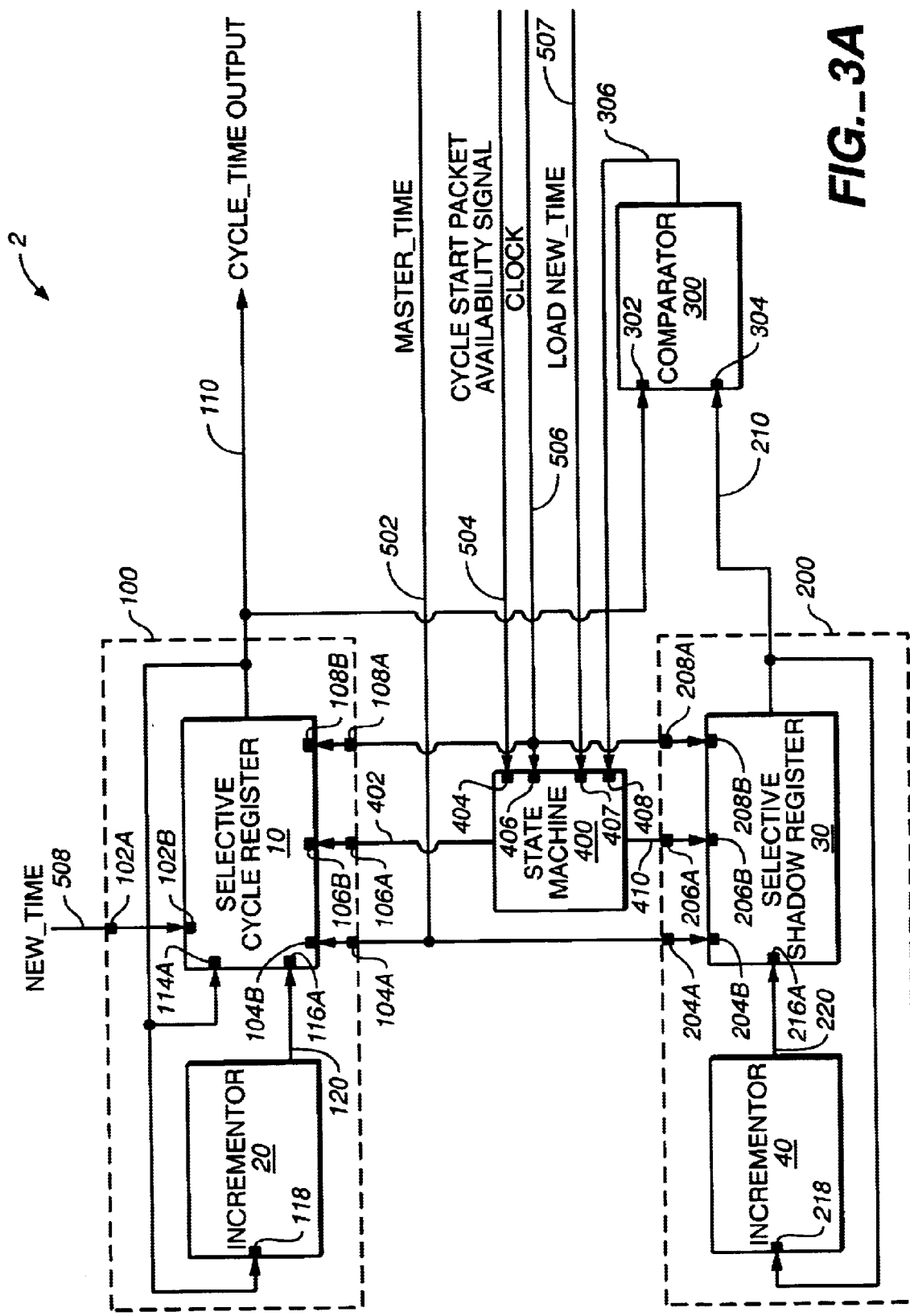
FIG._3A

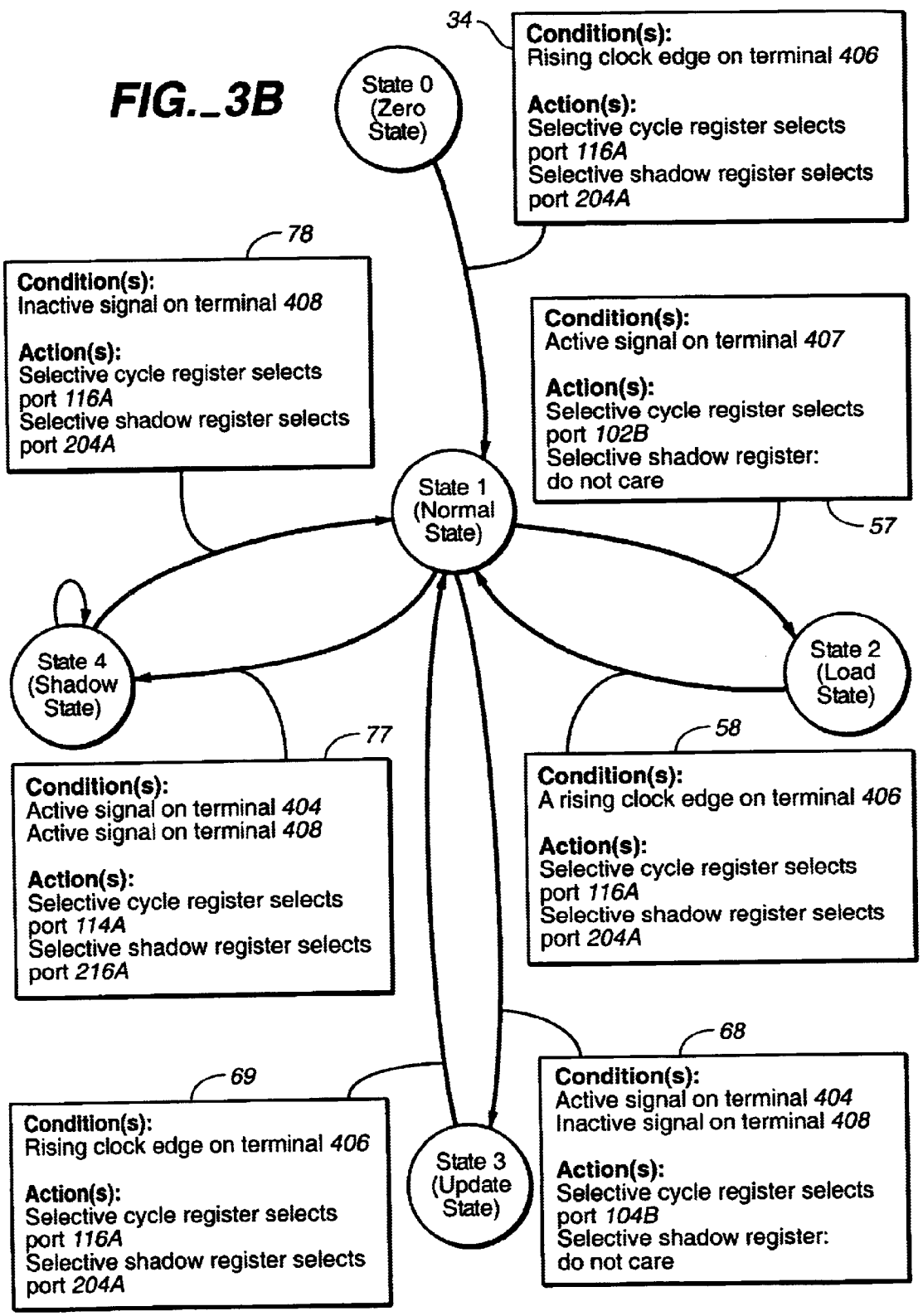
FIG._3B

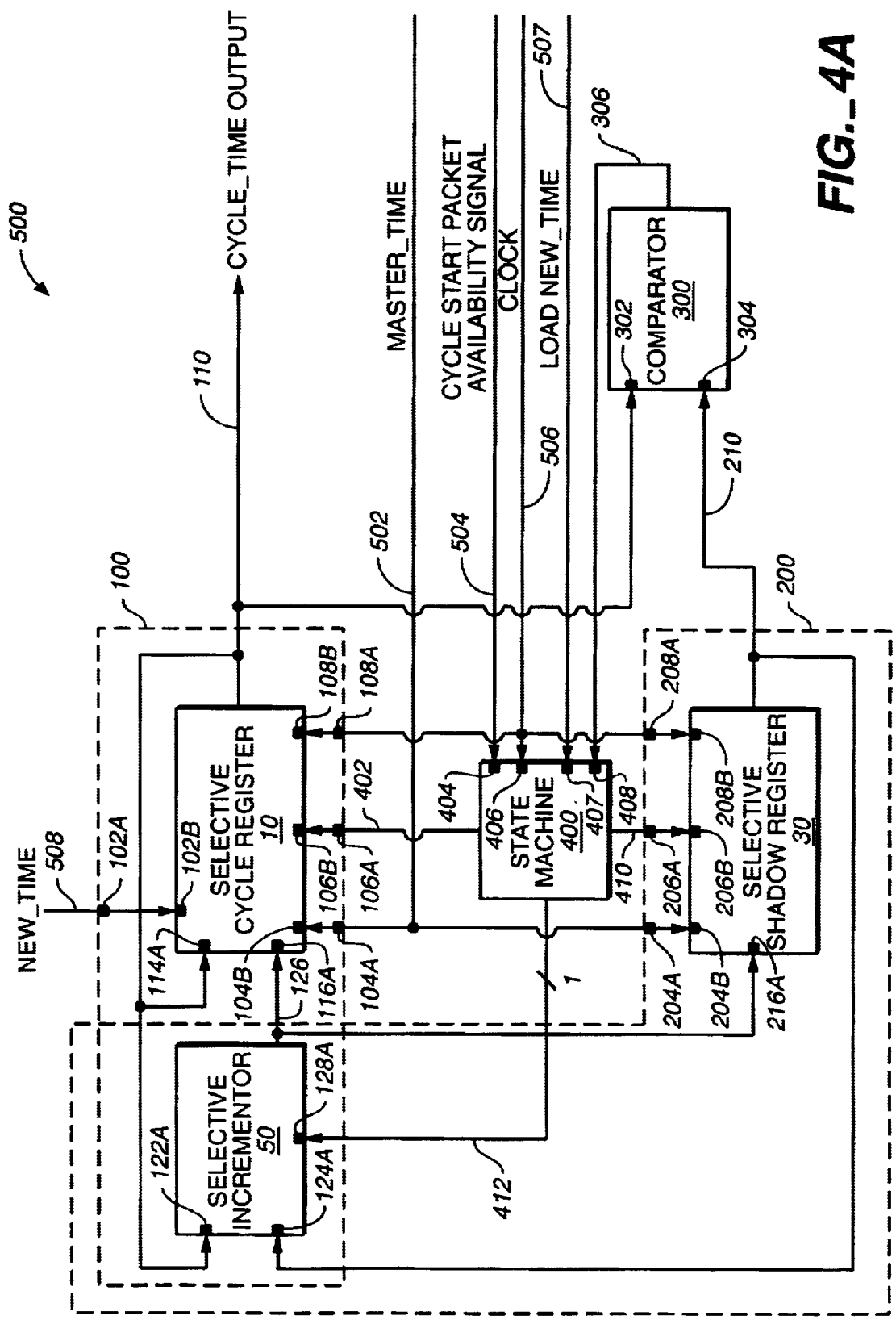

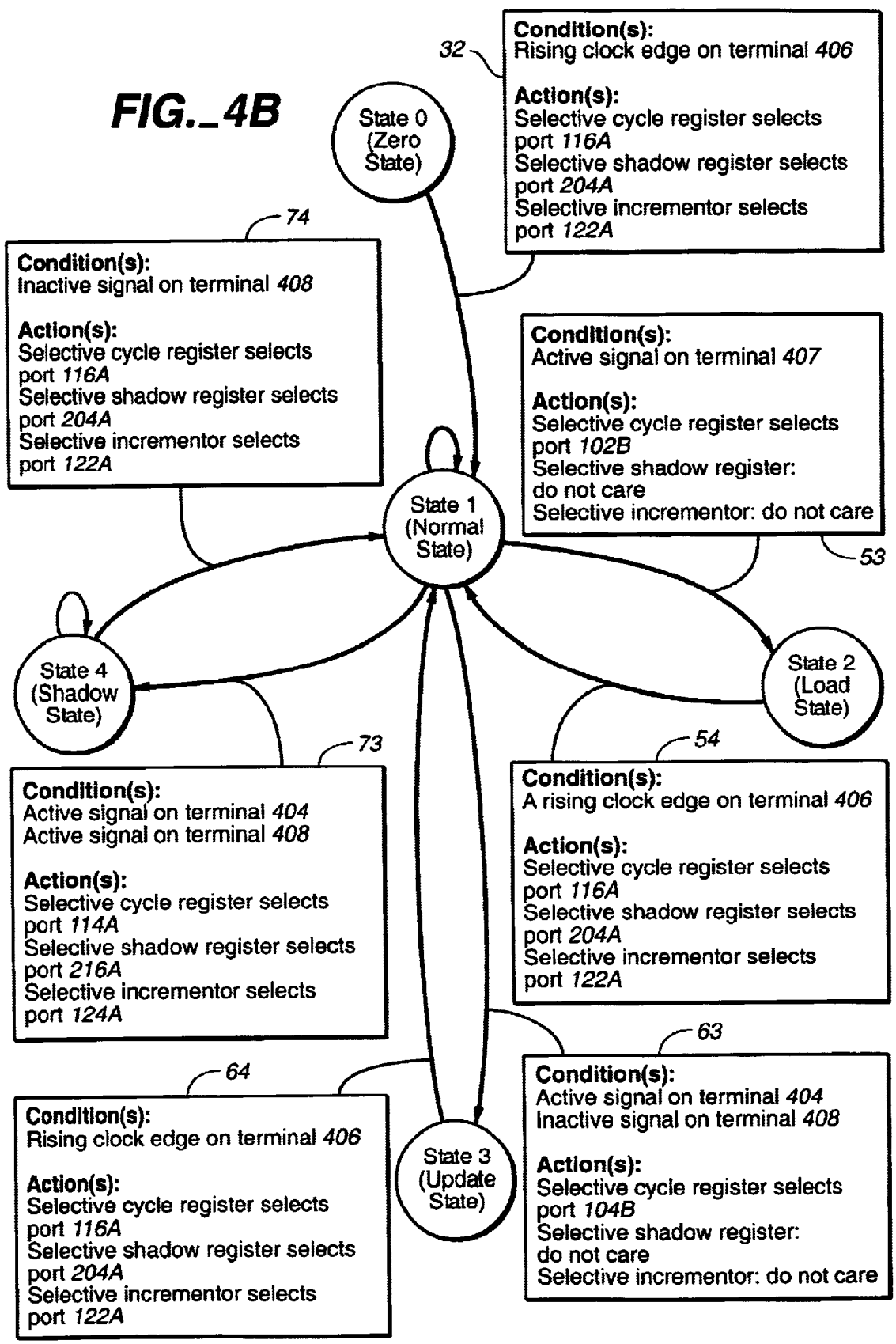

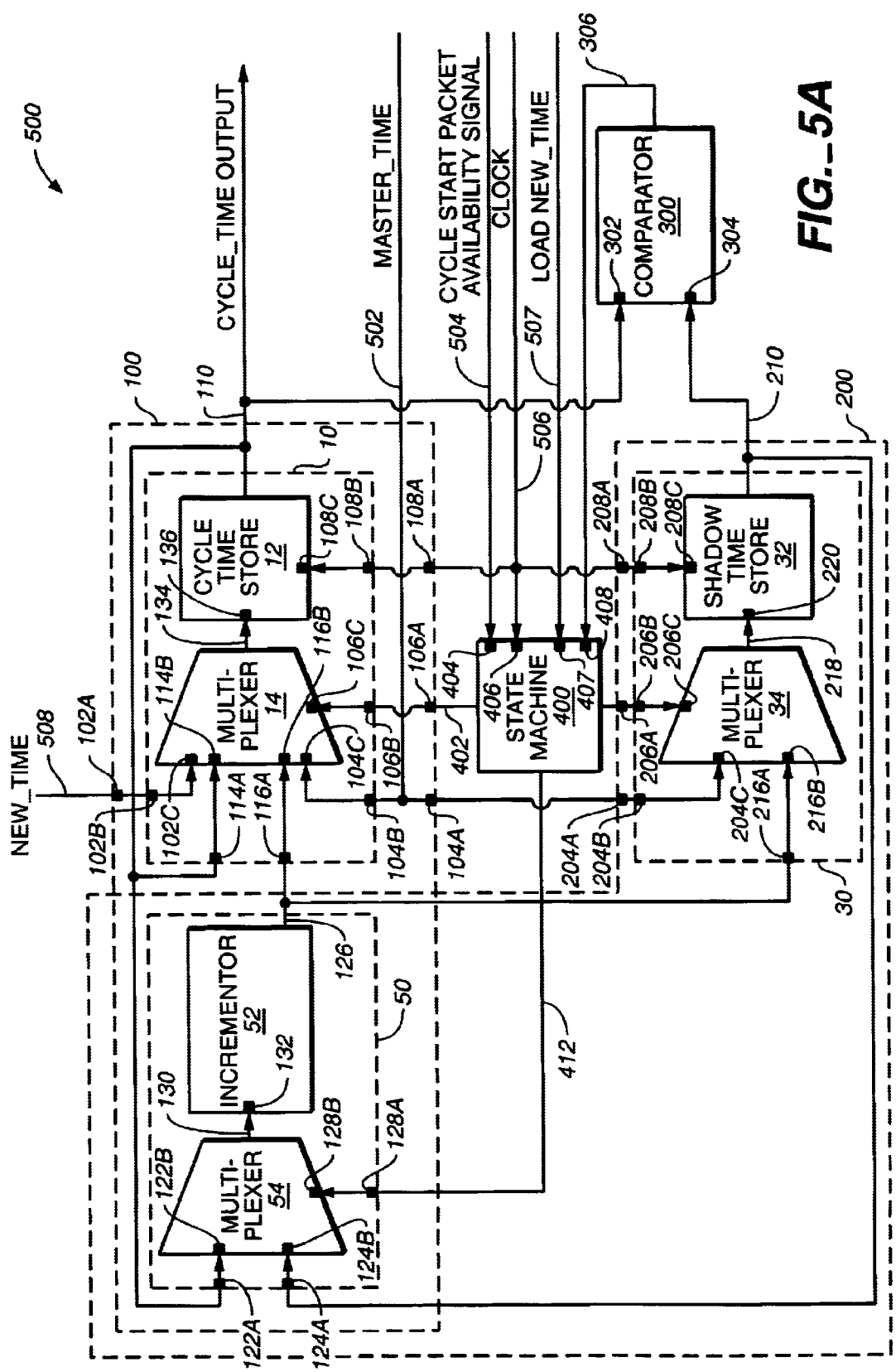

METHOD AND MECHANISM FOR SYNCHRONIZING A SLAVE'S TIMER TO A MASTER'S TIMER

CROSS-REFERENCE TO SOURCE CODE APPENDIX

Appendix A, which is part of the present disclosure, contains VERILOG source code for implementing one embodiment of this invention as described more completely below.

A portion of the present disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

IEEE Standard for a High Performance Serial Bus ("IEEE 1394") provides that each isochronous-capable node must implement, among others, a CYCLE_TIME register storing a 32 bit time signal ("CYCLE_TIME") updated by a free-running 24.576 MHz clock. An isochronous-capable node is a device that can transfer isochronous data over a serial bus to other isochronous-capable nodes. In isochronous data transfer, data is broadcasted on assigned channels with guaranteed bandwidth allocation.

Signal CYCLE_TIME in the CYCLE_TIME register comprises a seven bit second_count field, a thirteen bit cycle_count field, and a twelve bit cycle_offset field. The cycle_offset field increments on each tick of the 24.576 MHz clock with the exception that an increment from the value of 3071 causes a wraparound to zero and a carry into the cycle_count field. The cycle_count field increments on each carry from the cycle_offset field with the exception that an increment from the value of 7999 causes a wraparound to zero and a carry into the cycle_count field. The second_count field increments on each carry from the cycle_count field with the exception that an increment from the value of 127 causes a wraparound to zero.

The CYCLE_TIME register must further be synchronized to a time signal ("MASTER_TIME") contained in a cycle start packet ("CSP") transmitted by a node known as the master node. Specifically, IEEE 1394 standard provides that "a cycle slave must implement a synchronization mechanism between the cycle start packets and the CYCLE_TIME register such that time, as observed by the values of the CYCLE_TIME register, never appears to move backwards." IEEE Standard for a High Performance Serial Bus, p.212, The Institute of Electrical And Electronics Engineers, Inc., 1996. However, the details of the synchronization mechanism are left to the individual device manufacturers.

The IEEE 1394 standard is available from the Institute of Electrical and Electronic Engineers located at 345 East 47th Street, New York, N.Y. 100107-2394. The IEEE 1394 can be purchased directly from the IEEE. The IEEE 1394 standard is hereby incorporated by reference in its entirety.

An implementation of IEEE 1394 standard includes a first node 600 and a second node 700 coupled through a cable 614 (FIG. 1A). Node 600 includes an application logic 602, a link controller 604, and a PHY chip 606. Circuitry included in application logic 602 (FIG. 1B) depends on the application. For example, for a set top box, logic 602 includes RF tuner, IF tuner, forward error correction circuit, MPEG2 transport stream decoder, MPEG2 video decoder, MPEG2 audio decoder, smartcard interface, and memory (ROM and RAM). Similarly, node 700 includes another application logic 702, a link controller 704, and a PHY chip 706. Link controller 604 (FIG. 1B) includes a packet transmitter 608, a packet receiver 610, and a cycle control 612. Cycle control 612 includes a register 603 conforming to the IEEE 1394 standard. PHY chip 606 also includes, for example, 24.576 MHz clock 616. Note that when node 600 is in master mode, packet transmitter 608 uses the value of register 603 to generate a cycle start packet, as described in the IEEE 1394 standard.

SUMMARY

In accordance with the present invention, a circuit for synchronizing a first time signal to a second time signal includes a first timer, a second timer, and a comparator. The first timer repetitively increments (once during each clock cycle) the first time signal and drives the first time signal on an output bus of the first timer. The second timer saves a time signal from a master node as a second time signal and drives the second time signal on an output bus of the second timer. The comparator is coupled to the output bus of the first timer and the output bus of the second timer. The comparator compares the first time signal and the second time signal. When the second time signal is less than the first time signal, the first timer stops incrementing the first time signal, i.e., freezes the first time signal. At the same time, the second timer starts to repetitively increment (once during each clock cycle) the second time signal. As before, the second timer continues to drive the second time signal on the output bus of the second timer. When the second time signal is equal to the first time signal, the first timer starts again to repetitively increment and drive the first time signal on the output bus of the first timer. At the same time, the second timer stops incrementing the second time signal.

In one embodiment of the present invention, the first timer includes a first register coupled to a first multiplexer, together hereafter referred to as a "first selective register." The first timer also includes an incrementor coupled to a second multiplexer, together hereafter referred to as a "selective incrementor." To increment the first time signal, the output bus of the first register is coupled to input port of the incrementor through the second multiplexer and the output bus of the incrementor is coupled to the input port of the first register. To freeze the first time signal, the output bus of the first register is coupled to the input port of the first register through the first multiplexer.

In another embodiment, the second timer includes a second register coupled to a third multiplexer, together hereafter referred to as a "second selective register," and also includes the selective incrementor (described above). To increment the second time signal, the output bus of the second register is coupled to input port of the incrementor through the second multiplexer and the output bus of the incrementor is coupled to the input port of the second register through the third multiplexer. In one embodiment, the first timer and the second timer use separate incrementors to increment the first time signal and the second time signal, respectively. In another embodiment, the first timer and the second timer use a single incrementor to increment the first time signal and the second time signal.

BRIEF DESCRIPTION OF THE DRAWINGS

FIG. 1A illustrates, in a high level block diagram, prior art architecture of IEEE 1394.

FIG. 1B illustrates, in a high level block diagram, a prior art link controller.

FIG. 2A illustrates, in a high level block diagram, a circuit used to synchronize an internal time signal ("CYCLE_TIME") to an external time signal ("MASTER_TIME") in accordance with one embodiment of the present invention.

FIG. 2B illustrates, in a flow chart, a method used to synchronize an internal time signal to an external time signal in accordance to one embodiment of the present invention.

FIG. 2C illustrates, in a state diagram, a state machine used to implement the circuit illustrated in FIG. 2A in accordance with the method illustrated in FIG. 2B.

FIG. 3A illustrates, in an intermediate-level block diagram, an implementation of the circuit illustrated in FIG. 2A.

FIG. 3B illustrates, in a state diagram, a state machine used to implement the circuit illustrated in FIG. 3A in accordance with the method illustrated in FIG. 2B.

FIG. 4A illustrates, in an intermediate-level block diagram, another implementation of the circuit illustrated in FIG. 2A.

FIG. 4B illustrates, in a state diagram, a state machine used to implement the circuit illustrated in FIG. 4A in accordance with the method illustrated in FIG. 2B.

FIG. 5A illustrates, in a low level block diagram, the circuit illustrated in FIG. 4A.

DETAILED DESCRIPTION

Figure 5B:
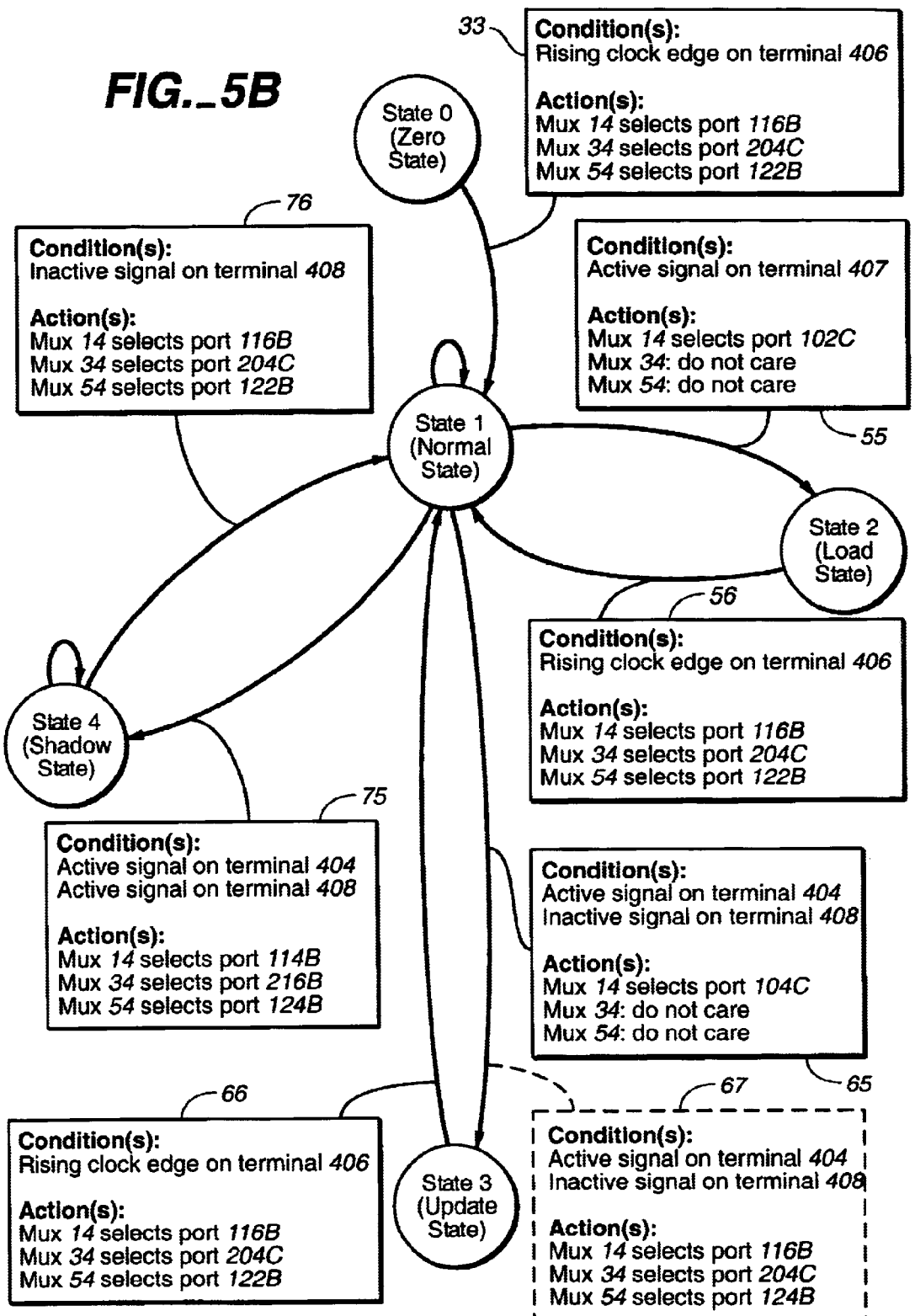
FIG. 5B illustrates, in a state diagram, a state machine used to implement the circuit illustrated in FIG. 5A in accordance with the method illustrated in FIG. 2B.

A cycle control 512 (FIG. 2A) in accordance with the present invention synchronizes a first time signal to a second time signal by use of a first timer 100 ("cycle timer 100"), a second timer 200 ("shadow timer 200") and a comparator 300. Specifically, first timer 100 repetitively increments (once during each clock cycle) an internal time signal (also called "first time signal", and "CYCLE_TIME"), and drives the internal time signal on an output bus 110 (FIG. 2A). Shadow timer 200 saves an external time signal (also referred to "MASTER_TIME") and increments the saved time signal and supplies the incremented value on an output bus 210 as a second time signal.

Comparator 300 is coupled to output bus 110 and output bus 210 of the timers 100 and 200 respectively. Comparator 300 compares the two time signals from the timers 100 and 200, and drives a resulting signal on line 306 to state machine 400. When the second time signal is less than the first time signal, state machine 400 stops incrementing the first time signal, i.e. freezes the first time signal. At the same time, state machine 400 causes shadow timer 200 to repetitively increment the second time signal. When the second time signal is equal to the first time signal, state machine 400 causes cycle timer 100 to again repetitively increment the first time signal. At the same time, state machine 400 causes shadow timer 200 to stop incrementing the second time signal. Therefore, state machine 400 alternates between incrementing the two timer signals, depending on their values relative to one another.

The first time signal is used by various circuits, such as one or more of: A packet transmitter (when acting in master mode as described above), a packet parser (which parses a packet received by the packet receiver using a format similar or identical to the packet format defined in section 6.2 of the IEEE 1394 specification), and a packet generator (which generates a packet supplied to the packet transmitter).

In one implementation, application logic 522 (FIG. 2A) includes a packet parser 523 that parses a data field, e.g., in a IEEE 1394 packet by use of a format defined in FIG. 6 of the IEC 61883-1 specifications (first edition, published 1998 and incorporated by reference herein in its entirety), to recover a time stamp, and holds the packet until the time stamp matches the first time signal. See FIG. 4 of IEC 61883-4 for a description of the exemplary method (first edition, published 1998, and incorporated by reference herein in its entirety). In this implementation, packet generator 524 inserts the first time signal into a packet as the time stamp in a similar manner. Also in this implementation, application logic 522 includes an I/O circuit (not labeled) that is used to transfer a first time signal to another device in logic 522, e.g., a packet flow controller.

In one embodiment, cycle timer 100 includes a first port 102A (also called "first time port") and, a second port (also called "second time port") 104A, and receives thereon time signals from application logic 522 and from a PHY device 525 respectively. In addition, cycle timer 100 includes a command port 106A, a clock terminal 108A, and an output bus 110. Port 102A is coupled to a time bus 508, which carries a time signal ("NEW_TIME") (e.g., 32 bits wide) from an external source, for example, application logic 522 which is included in node 500 (FIG. 2A). Port 104A is coupled to a bus 502 ("MASTER_TIME bus") from a packet receiver 610 (FIG. 1B), which carries a time signal ("MASTER_TIME") (e.g., 32 bits wide) from the cycle start packet transmitted by the master node. Port 106A is coupled to a command bus 402 (e.g., 2 bits wide), which carries command signals from state machine 400. Terminal 108A is coupled to a clock line 506, which carries a CLOCK signal from PHY device 525. PHY device 525 conforms to e.g. Annex J of the IEEE 1394 standard (e.g. see page 333 of the edition published on 1995 which is incorporated by reference above).

As noted above, cycle timer 100 stores, drives (i.e., outputs), and increments a signal CYCLE_TIME that is provided by cycle control circuit 512 to the other components of a link controller. Cycle timer 100 operates in four modes. In a first mode ("first cycle timer mode"), cycle timer 100 drives signal CYCLE_TIME on bus 110 at, for example, each rising edge in clock signal from oscillator received on terminal 108A and then increments signal CYCLE_TIME. In a second mode ("second cycle timer mode"), cycle timer 100 saves a time signal ("NEW_TIME") received on port 102A as signal CYCLE_TIME, where signal NEW_TIME has the same structure as signal CYCLE_TIME. In a third mode ("third cycle timer mode"), cycle timer 100 saves signal MASTER_TIME received on port 104A as signal CYCLE_TIME, where signal MASTER_TIME has the same structure as signal CYCLE_TIME. In a fourth mode ("fourth cycle timer mode"), cycle timer 100 drives signal CYCLE_TIME on bus 110 at, for example, each rising edge in the signal received on clock terminal 108A without incrementing signal CYCLE_TIME, thereby freezing signal CYCLE_TIME. The above operation modes of cycle timer 100 are controlled through command signals received on port 106A from state machine 400.

Shadow timer 200 includes a first port (also called "first time port") 204A on which the external time signal is received, a terminal (also called "command terminal") 206A on which signals from state machine 400 are received. Shadow timer 200 also has a clock terminal 208A, and a time bus 210. Port 204A is coupled to MASTER_TIME bus 502 and terminal 208A is coupled to clock line 506. Terminal 206A is coupled to a command line 410, which carries command signals from state machine 400.

Shadow timer 200 stores, drives, and increments a SHADOW_TIME signal that has the same structure as signal CYCLE_TIME. Shadow timer 200 operates in two modes. In a first mode ("first shadow timer mode"), shadow timer 200 saves signal MASTER_TIME received on port 204A as the SHADOW_TIME signal and drives the SHADOW_TIME signal on bus 210 at, for example, each rising edge in the signal received on clock terminal 208A. In a second mode ("second shadow timer mode"), shadow timer 200 drives the SHADOW_TIME signal on bus 210 at, for example, each rising edge in the signal received on bus 110 and then increments the SHADOW_TIME signal. The above described modes of shadow timer 200 are controlled through command signals received on terminal 206A, e.g. from state machine 400.

Comparator 300 includes a first time port 302, a second time port 304, and a comparator result line 306. Port 302 is coupled to time bus 110 from cycle timer 100 and port 304 is coupled to time bus 210 from shadow timer 200.

Comparator 300 compares the value of signal SHADOW_TIME received from bus 210 to the value of signal CYCLE_TIME received from bus 110. Comparator 300 drives, for example, an active signal on line 306 if the value of signal CYCLE_TIME is greater than the value of signal SHADOW_TIME. If the value of signal CYCLE_TIME is less than or equal to the value of signal SHADOW_TIME, comparator 300 outputs an inactive signal on line 306.

State machine 400 includes a terminal (also called "cycle start packet" ("CSP") terminal) 404 to receive an active signal from packet receiver 610 if a new CSP is available, or otherwise an inactive signal. An active signal on CSP line 504 connected to terminal 404 means that cycle control 512 must synchronize signal CYCLE_TIME to signal MASTER_TIME contained in the CSP to comply with the requirements of IEEE 1394. State machine 400 also includes a clock terminal 406, a comparator result terminal 408, a command bus 402, and command line 410. Clock terminal 406 is coupled to the clock line 506. Comparator result terminal 408 is coupled to comparator result line 306 that is coupled to comparator 300. State machine 400 also has a terminal 407 (also called "load NEW_TIME terminal") which is coupled to a line (also called "load NEW_TIME line") 507, which carries, e.g., an active signal if an external source, e.g., a user who supplies the signal via computer software, wants to save a signal NEW_TIME from bus 508 into cycle timer 100.

State machine 400 starts with action 12 (FIG. 2B). Action 12 is followed by action 14. In action 14, state machine 400 commands cycle timer 100 to drive signal CYCLE_TIME on bus 110 at each rising edge in the signal ("rising clock edge") received on terminal 108A and then increment signal CYCLE_TIME. State machine 400 also commands shadow timer 200 to save signal MASTER_TIME received on port 204A as the SHADOW_TIME signal and drive the SHADOW_TIME signal on bus 210 at each rising clock edge received on clock terminal 208A. To do this, state machine 400 drives a signal on command bus 402 for cycle timer 100 to enter into the previously described first cycle timer mode, and a command on command line 410 for shadow timer 200 to enter the first shadow timer mode.

In one embodiment, action 14 occurs simultaneously with decisional action 16, decisional action 20, and decisional action 21. In action 16, state machine 400 determines if it must save a signal NEW_TIME into cycle timer 100. State machine 400 must save a signal NEW_TIME into cycle timer 100 when it receives an active signal on load signal NEW_TIME terminal 407. An active signal on terminal 407 indicates that an external source, e.g., a computer software, wants to save a signal NEW_TIME into cycle timer 100. If state machine 400 must save a signal NEW_TIME into cycle timer 100, action 16 is followed by action 18. Otherwise, action 16 is followed by action 20.

In action 18, state machine 400 commands cycle timer 100 to save signal NEW_TIME received on port 102A as signal CYCLE_TIME of state machine 400. To do this, state machine 400 drives a signal on command bus 402 for cycle timer 100 to enter into the previously described second cycle timer mode. Action 18 is followed by action 14.

In action 20, state machine 400 determines if signal MASTER_TIME is valid, i.e., a new signal MASTER_TIME. Signal MASTER_TIME is valid if state machine 400 receives an active signal on CIP availability line 504. If signal MASTER_TIME is valid, action 20 is followed by action 21. Otherwise, action 20 is followed by action 14.

In action 21, state machine 400 determines if signal SHADOW_TIME is greater than or equal to signal CYCLE_TIME, indicated by an inactive signal on terminal 408. Please note that the SHADOW_TIME signal has the same value as signal MASTER_TIME contained in the CSP because shadow timer 200 is still in the first shadow timer mode. If so, action 21 is followed by action 22. Otherwise, action 20 is followed by action 26.

In action 22, state machine 400 commands cycle timer 100 to save signal MASTER_TIME received on port 104A as signal CYCLE_TIME. To do this, state machine 400 drives a signal on bus 402 for cycle timer 100 to enter the previously described third cycle timer mode. Action 22 is followed by action 14.

In action 26, state machine 400 commands cycle timer 100 to drive signal CYCLE_TIME on bus 110 at each rising clock edge received on terminal 108A without incrementing, i.e., freezing, signal CYCLE_TIME. State machine 400 also commands shadow timer 200 to drive the SHADOW_TIME signal on bus 210 at each rising clock edge received on terminal 208A and then increment the SHADOW_TIME signal. To do this, state machine 400 drives a signal on command bus 402 for cycle timer 100 to enter the fourth cycle timer mode, and a command on line 410 for shadow timer 200 to enter the second shadow timer mode. Action 26 is followed by action 28.

In action 28, state machine 400 determines if it must unfreeze signal CYCLE_TIME in cycle timer 100. State machine 400 must unfreeze signal CYCLE_TIME in cycle timer 100 if signal SHADOW_TIME is greater than or equal to signal CYCLE_TIME, indicated by an inactive signal on terminal 408. If state machine 400 must unfreeze signal CYCLE_TIME, action 28 is followed by action 14. Otherwise, action 28 is followed by action 26.

State machine 400 (FIG. 2C) starts in state 0 ("zero state"). State machine 400 transitions from state 0 to state 1 on receiving a rising clock edge on clock terminal 406.

To transition from state 0 to state 1 ("normal state"), state machine 400 drives (1) a command on command bus 402 for cycle timer 100 to enter into the first cycle timer mode and (2) a command on command line 410 for shadow timer 200 to enter the first shadow timer mode. The conditions and actions for the transition from state 0 to state 1 are captioned in box 31 of FIG. 2C.

State machine 400 transitions from state 1 to state 2 ("load state") on the condition of state machine 400 receiving an active signal on terminal 407. As previously described, terminal 407 is coupled to load NEW_TIME line 507, which carries an active signal if an external source, e.g., a computer software, wants to save a signal NEW_TIME on bus 508 into cycle timer 100.

To transition from state 1 to state 2, state machine 400 drives a signal on command bus 402 for cycle timer 100 to enter into the second cycle timer mode. The shadow timer mode is irrelevant in the transition from state 1 to state 2. The conditions and actions for the transition from state 1 to state 2 are captioned in box 51 of FIG. 2C.

State machine 400 transitions from state 2 to state 1 on the condition of state machine 400 receiving a rising clock edge on terminal 406. To transition from state 2 to state 1, state machine 400 drives (1) a signal on command bus 402 for cycle timer 100 to enter into the first cycle timer mode and (2) a signal on command line 410 for shadow timer 200 to enter the first shadow timer mode. The conditions and actions for the transition from state 2 to state 1 are captioned in box 52 of FIG. 2C.

State machine 400 transitions from state 1 to state 3 ("update state") on the conditions of state machine 400 receiving of an active signal on terminal 404 and an inactive signal on terminal 408. As previously described, terminal 404 is coupled to a CSP availability line 504, which carries an active signal if a new CSP is available. Terminal 408 is coupled to coupled to comparator result line 306, which carries an inactive signal if the CYCLE_TIME is less than or equal to the SHADOW_TIME signal.

To transition from state 1 to state 3, state machine 400 drives a signal on command bus 402 for the cycle timer to enter the third cycle timer mode. The shadow timer mode is irrelevant in the transition from state 1 to state 3. The conditions and actions for the transition from state 1 to state 3 are as follows:

State machine 400 transitions from state 3 to state 1 on the condition of state machine 400 receiving a rising clock edge on clock terminal 406. To transition from state 3 to state 1, state machine 400 drives (1) a signal on command bus 402 for cycle timer 100 to enter the first cycle timer mode and (2) a signal command line 410 for shadow timer 200 to enter the first shadow timer mode. The conditions and actions for the transition from state 3 to state 1 are captioned in box 62 of FIG. 2C.

State machine 400 transitions from state 1 to state 4 on the conditions of state machine 400 receiving an active signal on terminal 404 and an active signal on terminal 408. To transition from state 1 to state 4, state machine 400 drives (1) a signal on command bus 402 for cycle timer 100 to enter the fourth cycle timer mode and (2) a signal on command line 410 to shadow timer 200 to enter the second shadow timer mode. The conditions and actions for the transition from state 1 to state 4 are captioned in box 71 of FIG. 2C.

State machine 400 transitions from state 4 to state 1 on the condition of state machine receiving an inactive signal on terminal 408. To transition from state 4 to state 1, state machine 400 drives (1) a signal on command bus 402 for cycle timer 100 to enter the first cycle timer mode and (2) a signal on command line 410 for shadow timer 200 to enter the first shadow timer mode. The conditions and actions for the transition from state 4 to state 1 are captioned in box 72 of FIG. 2C.

In one embodiment, cycle timer 100 (FIG. 3A) includes a cycle register (as called "selective cycle register") 10 and a first incrementor 20, and shadow timer 200 includes another selective register (also called "selective shadow register") 30 and a second incrementor 40.

A selective register as used herein is a circuit that can select an input source from a plurality of input sources, store the signal carried by the selected input source and supply the stored signal after one clock delay. In this embodiment, selective cycle register 10 includes a first time input port 102B, a second time input port 104B, a command port 106B, a clock terminal 108B, time bus 110, a third time input port 116A, and a fourth time input selective port 114A, where port 114A is coupled to time bus 110. Thus, selective cycle register 10 can store therein a time signal from any of the following four ports: Port 102B, port 104B, port 1114A, and port 116A. Selective cycle register 10 outputs the time signal on time bus 110 with one clock delay. Port 102B, port 104B, port 106B, and terminal 108B are respectively coupled to port 102A, port 104A, port 106A, and terminal 108A. Port 102B, port 104B, port 106B, and terminal 108B respectively receive the time signal on bus 508 (NEW_TIME), the time signal on bus 502 (MASTER_TIME), command signals on bus 402, and the clock signal on line 506.

Each of incrementors 20 and 40 increments the value of an input signal (e.g. 32 bit signal) by one. In one implementation, incrementor 20 increments the value field of signal CYCLE_TIME. Incrementor 20 includes an incrementor port 118 and an incrementor bus 120. Incrementor port 118 is coupled to time bus 110, and incrementor bus 120 (carrying the incremented CYCLE_TIME) is coupled to port 116A of selective cycle register 10.

Selective shadow register 30 includes a first time port 204B, a command terminal 206B, a clock terminal 208B, time output bus 210, and a selective port 216A. Thus, selective shadow register 30 can select a time signal from one of port 204B and port 216A, and output the time signal on bus 210B with one clock delay. Port 204B, terminal 206B, and terminal 208B are respectively coupled to port 204A, terminal 206A, and terminal 208A. Port 204B, terminal 206B and terminal 208B respectively receive the time signal on bus 502 (MASTER_TIME), command signals on line 410, and the clock signal on line 506.

In one implementation, incrementor 40 increments the value of the signal SHADOW_TIME. Incrementor 40 includes an incrementor port 218 and an incrementor bus 220. Incrementor port 218 is coupled to time bus 210 of selective shadow register 30, and incrementor bus 220 (carrying the incremented SHADOW_TIME) is coupled to selective port 216A.

The previously discussed cycle timer modes are now explained in relation to one implementation having selective cycle register 10 and incrementor 20. In the first cycle timer mode, cycle timer 100 drives signal CYCLE_TIME on bus 110 at each rising clock edge received on terminal 108A and then increment signal CYCLE_TIME. To do so, selective cycle register 10 selects port 116A of incrementor 20 as its input source. Thus, at each rising clock edge, selective cycle register 10 drives onto time bus 110 a time signal it received at the previous rising clock edge at port 116A from incrementor 20, and incrementor 20 constantly increments the time signal it receives at port 118 from selective cycle register 10 and drives the incremented time signal on bus 120.

In the second cycle timer mode, cycle timer 100 saves a signal CYCLE_TIME received on port 102A as signal CYCLE_TIME of state machine 400. To do this, selective cycle register 10 selects port 102B as its input source.

In the third cycle timer mode, cycle timer 100 saves signal MASTER_TIME received on port 104A as signal CYCLE_TIME of state machine 400. To do so, selective cycle register 10 selects port 104B as its input source for one clock cycle.

In the fourth cycle timer mode, cycle timer 100 drives signal CYCLE_TIME on bus 110 at each rising clock edge received on bus 108A without incrementing signal CYCLE_TIME, thereby freezing signal CYCLE_TIME. To do this, selective cycle register 10 selects port 114A as its input source. Thus, selective cycle register falls into a loop where it drives the same time signal it generated at the previous rising clock edge. The above operation modes of cycle timer 100 are controlled by command signals from state machine 400 received on port 106B of selective cycle register 10 in accordance to the state diagram illustrated in FIG. 2C.

The previously discussed shadow timer modes are now explained in relation to the implementation having selective shadow register 30 and incrementor 40. In the first shadow timer mode, shadow timer 200 saves signal MASTER_TIME received on port 204A as the SHADOW_TIME signal and drives SHADOW_TIME on bus 210 at each rising clock edge received on bus 110. To do this, selective shadow register 30 selects port 204B as its input source.

In the second shadow timer mode, shadow timer 200 drives the SHADOW_TIME signal on time bus 210 at each rising clock edge received terminal 208A and then increments the SHADOW_TIME signal. To do this, selective shadow register 30 selects port 216A as its input source. Thus, at each rising clock edge, selective shadow register 30 drives onto time bus 210 a time signal it received at the previous rising clock edge at port 216A from incrementor 40, and incrementor 40 constantly increments the time signal it receives at port 218 from selective shadow register 30 and drives the incremented time signal on bus 220. The above operation modes of shadow timer 200 are controlled through command signals received from state machine 400 on terminal 206B of selective shadow register 30 in accordance to the state diagram illustrated in FIG. 2C.

FIG. 3B illustrates a state diagram for the embodiment illustrated in FIG. 3A in accordance with the method illustrated in FIG. 2B. State machine 400 starts in state 0 ("zero state"). State machine 400 transitions from state 0 to state 1 on the condition of state machine 400 receiving a rising clock edge on clock terminal 406. To transition from state 0 to state 1 ("normal state"), state machine 400 drives (1) a command on command bus 402 for selective cycle register 10 to select port 116A as its input source and (2) a command on command line 410 for selective shadow register 30 to select port 204A as its input source. The conditions and actions for the transition from state 0 to state 1 are captioned in box 34 of FIG. 3B.

State machine 400 transitions from state 1 to state 2 ("load state") on the condition of state machine 400 receiving an active signal on terminal 407. To transition from state 1 to state 2, state machine 400 drives a signal on command bus 402 for selective cycle register 10 to select port 102B as its input source. The action of selective shadow register 30 is irrelevant for the transition from state 1 to state 2. The conditions and actions for the transition from state 1 to state 2 are captioned in box 57 of FIG. 3B.

State machine 400 transitions from state 2 to state 1 on the condition of state machine 400 receiving a rising clock edge on terminal 406. To transition from state 2 to state 1, state machine 400 drives (1) a signal on command bus 402 for selective cycle register 10 to select port 116A as its input source and (2) a signal on command line 410 for selective shadow register 30 to select port 204A as its input source. The conditions and actions for the transition from state 2 to state 1 are captioned in box 58 of FIG. 3B.

State machine 400 transitions from state 1 to state 3 ("update state") on the conditions of state machine 400 receiving of an active signal on terminal 404 and an inactive signal on terminal 408. To transition from state 1 to state 3, state machine 400 drives a signal on command bus 402 for selective cycle register 10 to select port 104B as its input source. The action of selective shadow register 30 is irrelevant for the transition from state 1 to state 3. The conditions and actions for the transition from state 1 to state 3 are captioned in box 68 of FIG. 4B.

State machine 400 transitions from state 3 to state 1 on the condition of state machine 400 receiving a rising clock edge on clock terminal 406. To transition from state 3 to state 1, state machine 400 drives (1) a signal on command bus 402 for selective cycle register 10 to select port 116A as its input source and (2) a signal on command line 410 for selective shadow register 30 to select port 204A as its input source. The conditions and actions for the transition from state 3 to state 1 are captioned in box 69 of FIG. 3B.

State machine 400 transitions from state 1 to state 4 on the conditions of state machine 400 receiving an active signal on terminal 404 and an active signal on terminal 408. To transition from state 1 to state 4, state machine 400 drives (1) a signal on command bus 402 for selective cycle register 10 to select port 114A as its input source and (2) a signal on command line 410 for selective shadow register 30 to select port 216A as its input source. The conditions and actions for the transition from state 1 to state 4 are captioned in box 77 of FIG. 3B.

State machine 400 transitions from state 4 to state 1 on the condition of state machine receiving an inactive signal on terminal 408. To transition from state 4 to state 1, state machine 400 drives (1) a signal on command bus 402 for selective cycle register 10 to select port 116A as its input source and (2) a signal on command line 410 for selective shadow register 30 to select port 204A as its input source. The conditions and actions for the transition from state 4 to state 1 are captioned in box 78 of FIG. 3B.

FIG. 4A illustrates another embodiment state machine 400 illustrated in FIG. 3A, where cycle timer 100 includes selective cycle register 10 and a selective incrementor 50, and shadow timer 200 includes selective shadow register 30 and selective incrementor 50. Selective incrementor 50 is an incrementor that can select an input source from a plurality of input sources and increment a signal from that that input source. Selective incrementor 50 includes a selective incrementor port 122A coupled to time bus 110, a selective incrementor port 124A coupled to time bus 210, a selective incrementor bus 126A coupled to port 116A of selective cycle register 10 and port 216A of selective shadow register 30, and a command terminal 128A. Thus, selective incrementor 50 can select an input source from port 122A (output from selective cycle register 10) and 124A (output from selective shadow register 30), and output the signal on bus 126A. In one implementation, selective incrementor 50 increments the value of signal CYCLE_TIME or the SHADOW_TIME signal.

In this embodiment, cycle timer 100 and shadow timer 200 are able to share selective incrementor 50, which replaces incrementor 20 and incrementor 40, because incrementor 20 and incrementor 40 are never used concurrently. In this embodiment, state machine 400 further includes a command line 412 coupled to terminal 128A to control the selection of the input source for selective incrementor 50.

The previously discussed cycle timer modes are now explained in relation to selective cycle register 10 and selective incrementor 50 of FIG. 4A. In the first cycle timer mode, cycle timer 100 drives signal CYCLE_TIME on bus 110 at each rising clock edge received on terminal 108A and then increment signal CYCLE_TIME. To do so, selective cycle register 10 selects port 116A as its input source and selective incrementor 50 selects port 122A as its input source. Thus, at each rising clock edge, selective cycle register 10 drives onto time bus 110 a time signal it received at the previous rising clock edge at port 116A from selective incrementor 50, and selective incrementor 50 constantly increments the time signal it receives at port 122A from selective cycle register 10 and drives the incremented time signal on bus 126.

The second, third, and fourth cycle timer mode remain unchanged. The above operation modes of cycle timer 100 are controlled by command signals from state machine 400 received on port 106B of selective cycle register 10 and port 128A of selective incrementor 50 in accordance to the state diagram illustrated in the to be described FIG. 4B.

The previously discussed shadow timer modes are now explained in relation to selective shadow register 30 and selective incrementor 50 of FIG. 4A. The first shadow mode remains unchanged.

In the second shadow timer mode, shadow timer 200 drives the SHADOW_TIME signal on time bus 210 at each rising clock edge received terminal 208A and then increments the SHADOW_TIME signal. To do this, selective shadow register 30 selects port 216A as its input source and selective incrementor 50 selects port 124A as its input source. Thus, at each rising clock edge, selective shadow register 30 drives onto time bus 210 a time signal it received at the previous rising clock edge at port 216A from selective incrementor 50, and selective incrementor 50 constantly increments the time signal it receives at port 124A from selective shadow register 30 and drives the incremented time signal on bus 126. The above operation modes of shadow timer 200 are controlled through command signals received from state machine 400 on command terminal 206B of selective shadow register 30 and command terminal 128A of selective incrementor 50 in accordance to the state diagram illustrated in the to be described FIG. 4B.

FIG. 4B illustrates a state diagram for the embodiment illustrated in FIG. 4A. State machine 400 starts in state 0 ("zero state"). State machine 400 transitions from state 0 to state 1 on the condition of state machine 400 receiving a rising clock edge on clock terminal 406. To transition from state 0 to state 1 ("normal state"), state machine 400 drives (1) a signal on command bus 402 for selective cycle register 10 to select port 116A as its input source, (2) a signal on command line 410 for selective shadow register 30 to select port 204A as its input source, and (3) a signal on command line 412 for selective incrementor 50 to select port 122A as its input source. The conditions and actions for the transition from state 0 to state 1 are captioned in box 32 of FIG. 4B.

State machine 400 transitions from state 1 to state 2 ("load state") on the condition of state machine 400 receiving an active signal on terminal 407. To transition from state 1 to state 2, state machine 400 drives a signal on command bus 402 for selective cycle register 10 to select port 102B as its input source. The actions of selective shadow register 30 and selective incrementor 50 are irrelevant for the transition from state 1 to state 2. The conditions and actions for the transition from state 1 to state 2 are captioned in box 53 of FIG. 4B.

State machine 400 transitions from state 2 to state 1 on the condition of state machine 400 receiving a rising clock edge on terminal 406. To transition from state 2 to state 1, state machine 400 drives (1) a signal on command bus 402 for selective cycle register 10 to select port 116A as its input source, (2) a signal on command line 410 for selective shadow register 30 to select port 204A as its input source, and (3) a signal on command line 412 for selective incrementor 50 to select port 122A as its input source. The conditions and actions for the transition from state 2 to state 1 are captioned in box 54 of FIG. 4B.

State machine 400 transitions from state 1 to state 3 ("update state") on the conditions of state machine 400 receiving of an active signal on terminal 404 and an inactive signal on terminal 408. To transition from state 1 to state 3, state machine 400 drives a signal on command bus 402 for selective cycle register 10 to select port 104B as its input source. The actions of selective shadow register 30 and selective incrementor 50 are irrelevant for the transition from state 1 to state 3. The conditions and actions for the transition from state 1 to state 3 are captioned in box 63 of FIG. 4B.

State machine 400 transitions from state 3 to state 1 on the condition of state machine 400 receiving a rising clock edge on clock terminal 406. To transition from state 3 to state 1, state machine 400 drives (1) a signal on command bus 402 for selective cycle register 10 to select port 116A as its input source, (2) a signal on command line 410 for selective shadow register 30 to select port 204A as its input source, and (3) a signal on command line 412 for selective incrementor 50 to select port 122A as its input source. The conditions and actions for the transition from state 3 to state 1 are captioned in box 64 of FIG. 4B.

State machine 400 transitions from state 1 to state 4 on the conditions of state machine 400 receiving an active signal on terminal 404 and an active signal on terminal 408. To transition from state 1 to state 4, state machine 400 drives (1) a signal on command bus 402 for selective cycle register 10 to select port 114A as its input source, (2) a signal on command line 410 for selective shadow register 30 to select port 216A as its input source, and (3) a signal on command line 412 for selective incrementor 50 to select port 124A as its input source. The conditions and actions for the transition from state 1 to state 4 are captioned in box 73 of FIG. 4B.

State machine 400 transitions from state 4 to state 1 on the condition of state machine receiving an inactive signal on terminal 408. To transition from state 4 to state 1, state machine 400 drives (1) a signal on command bus 402 for selective cycle register 10 to select port 116A as its input source, (2) a signal on command line 410 for selective shadow register 30 to select port 204A as its input source, and (3) a signal on command line 412 for selective incrementor 50 to select port 122A as its input source. The conditions and actions for the transition from state 4 to state 1 are captioned in box 74 of FIG. 4B.

FIG. 5A illustrates a low-level block diagram of the embodiment illustrated in FIG. 4A. As shown, selective cycle register 10 includes a cycle time store 12 and a first multiplexer 14 ("mux 14"). Cycle time store 12 includes a clock terminal 108C, time bus 110, and a store port 136. Clock terminal 108C is coupled to clock terminal 108B to receive the clock signal from clock line 506. Cycle time store 12 drives onto time bus 110 the time signal it receives on store port 136 with a one clock delay. Cycle time store 12 is, for example, a register.

Mux 14 includes a first time port 102C, a second time port 104C, a command port 106C, a first selective port 116B, a second selective port 114B, and a first multiplexer bus 134, where bus 134 is coupled to port 136 of cycle time store 12. Thus, mux 14 selects an input source among port 102C, port 104C, port 114C, and port 116C in accordance to signals received on port 106C, and outputs the time signal of the input source on bus 134 to port 136 of cycle time store 12. Port 102C, port 104C, port 106C, port 116B, and port 114B are coupled to port 102B, 104B, port 106B, port 116A, and port 114A, respectively, and receive the control signal on command bus 402, the time signal on bus 508 (NEW_TIME), the time signal on bus 502 (MASTER_TIME), the time signal on bus 126 (incremented CYCLE_TIME), and the time signal on bus 110 (frozen CYCLE_TIME).

Selective incrementor 50 includes an incrementor 52 and a second multiplexer 54 ("mux 54"). Incrementor 52 operates like incrementor 20 and incrementor 40 of FIG. 3A. Incrementor 52 includes an incrementor port 132 and an incrementor bus 126. Mux 54 includes a first port 122B, a second port 124B, a multiplexer bus 130, and a command terminal 128B, where bus 130 is coupled to incrementor port 132. Thus, mux 54 selects an input source among port 122B and 124B in accordance to the signal received on port 128B, and drives the signal of the input source on bus 130. Port 122B, port 124B, and terminal 128B are coupled to port 122A, port 124A, and terminal 128A, respectively, and receive the time signals on bus 110 (CYCLE_TIME), the time signal on bus 210 (SHADOW_TIME), and the signal from line 412.

The previously discussed cycle timer modes are now explained in relation to cycle time store 12, mux 14, incrementor 52, and mux 54 of FIG. 5A. In the first cycle timer mode, cycle timer 100 drives signal CYCLE_TIME on bus 110 at each rising clock edge received on terminal 108A and then increment signal CYCLE_TIME. To do so, mux 14 selects port 116B of incrementor 20 as its input source and mux 54 selects port 122B as its input source. Thus, at each rising clock edge, cycle time store 12 drives onto time bus 110 a time signal it received at the previous rising clock edge at port 136 from incrementor 52, and incrementor 52 constantly increments the time signal it receives at port 132 from cycle timer store 12 and drives the incremented time signal on bus 126.

In the second cycle timer mode, cycle timer 100 saves a signal NEW_TIME received on port 102A as signal CYCLE_TIME. To do so, mux 14 selects port 102C as its input source for one clock cycle, where port 102C is coupled to the NEW_TIME bus 508 through port 102B and port 102A.

In the third cycle timer mode, cycle timer 100 saves signal MASTER_TIME received on port 104A a signal CYCLE_TIME. To do so, mux 14 selects port 104C as its input source for one clock cycle, where port 104C is coupled to the MASTER_TIME bus 502 through port 104B and port 104A.

In the fourth cycle timer mode, cycle timer 100 drives signal CYCLE_TIME on time bus 110 at each rising clock edge received on clock terminal 108A without incrementing signal CYCLE_TIME. To do so, mux 14 selects port 114B as its input source, where port 114B is coupled to time output bus 110 through port 114A. The above operation modes cycle timer 100 are controlled by signals from state machine 400 received on port 106C of mux 14 and 128B of mux 54 in accordance to the state diagram illustrated in the to be described FIG. 5B.

Selective shadow register 30 includes shadow time store 32 and a third multiplexer 34 ("mux 34"). Shadow time store 32 includes a shadow timer clock input terminal 208C, time bus 210, and a time input port 220. Shadow time store 32 drives onto time bus 210 the signal it receives on port 220 with a one clock delay. Shadow time store 32 is, for example, a register.

Mux 34 includes a time port 204C, a command terminal 206C, a time port 216B, and a time bus 218, where bus 218 is coupled to port 220 of shadow time store 32. Thus, mux 34 can select an input source from port 204C and port 216B, and output the signal received from the input source on bus 218. Port 204C, terminal 206C, and port 216B are coupled to port 204B, terminal 206B, and port 216A, respectively, and receive the time signal (MASTER_TIME) on bus 502, the signal on line 410, and the time signal (incremented SHADOW_TIME) on bus 126.

The previously discussed shadow timer modes are now explained in relation to shadow time store 32, mux 34, incrementor 52, and mux 54 of FIG. 5A. In the first shadow timer mode, shadow timer 200 saves signal MASTER_TIME received on port 204A as the SHADOW_TIME signal and drives the SHADOW_TIME signal on time bus 210 at each rising clock edge received on clock terminal 208A. To do so, mux 34 selects port 204C as its input source, where port 204C is coupled to MASTER_TIME bus 502 through port 204B and port 204A.

In the second shadow timer mode, shadow timer 200 drives the SHADOW_TIME signal on time bus 210 at each rising clock edge received terminal 208A and then increments the SHADOW_TIME signal. To do so, mux 34 selects port 216B as its input source and mux 54 selects port 124B as its input source. Thus, at each rising clock edge, shadow time store 32 drives a time signal on bus 210 it received at the previous rising clock edge at port 220 from incrementor 52, and incrementor 52 constantly increments the time signal it receives at port 132 from shadow time store 32 and drives the incremented time signal on bus 126. The above operation modes of shadow timer 200 are controlled through signals received from state machine 400 on terminal 206C of mux 34 and terminal 128B of mux 54 in accordance to the state diagram illustrated in the to be described FIG. 5B. Appendix A contains microfiche of VERILOG source code implementing state machine 400 illustrated in FIG. 5A.

FIG. 5B illustrates a state diagram for the embodiment illustrated in FIG. 5A. State machine 400 starts in state 0 ("zero state"). State machine 400 transitions from state 0 to state 1 on the condition of state machine 400 receiving a rising clock edge on clock terminal 406. To transition from state 0 to state 1 ("normal state"), state machine 400 drives (1) a signal on command bus 402 for mux 14 to select port 116B, (2) a signal on command line 412 for mux 34 to select port 204C, and (3) a signal on command line 410 for mux 54 to select port 122B. The conditions and actions for the transition from state 0 to state 1 are captioned in box 33 of FIG. 5B.

State machine 400 transitions from state 1 to state 2 ("load state") on the condition of state machine 400 receiving an active signal on terminal 407. To transition from state 1 to state 2, state machine 400 drives a signal on command bus 402 for mux 14 to select port 102C. The actions of mux 34 and mux 54 are irrelevant in the transition from state 1 to state 2. The conditions and actions for the transition from state 1 to state 2 are captioned in box 55 of FIG. 5B.

State machine 400 transitions from state 2 to state 1 on the condition of state machine 400 receiving a rising clock edge on terminal 406. To transition from state 2 to state 1, state machine 400 drives (1) a signal on command bus 402 for mux 14 to select port 116B, (2) a signal on command line 412 for mux 34 to select port 204C, and (3) a signal on command line 410 for mux 54 to select port 122B. The conditions and actions for the transition from state 2 to state 1 are captioned in box 56 of FIG. 5B.

State machine 400 transitions from state 1 to state 3 ("update state") on the conditions of state machine 400 receiving of an active signal on terminal 404 and an inactive signal on terminal 408. In a first implementation, to transition from state 1 to state 3, state machine 400 drives a signal on command bus 402 for mux 14 to select port 104C. The actions of mux 34 and mux 54 are irrelevant in the transition from state 1 to state 3 of the first implementation. The actions for the first implementation are captioned in box 65 of FIG. 5B.

In a second implementation, to transition from state 1 to state 3, state machine 400 drives (1) a signal on command bus 402 for mux 14 to select port 116B, (2) a signal on command line 410 for mux 34 to select port 204C, and (3) a signal on command line 412 for mux 54 to select port 124B. The actions for the second implementation are captioned in box 67 of FIG. 5B. As configured, incrementor 52 increments the SHADOW_TIME signal, which is equal to signal MASTER_TIME, and drives the incremented SHADOW_TIME signal to cycle time store 12 to avoid a one clock delay caused by the first implementation. Both the first implementation and the second implementation share the same conditions for the transition from state 1 to state 3, which are captioned in both box 65 and box 67 of FIG. 5B.

State machine 400 transitions from state 3 to state 1 on the condition of state machine 400 receiving a rising clock edge on clock terminal 406. To transition from state 3 to state 1, state machine 400 drives (1) a signal on command bus 402 for mux 14 to select port 116B, (2) a signal on command line 412 for mux 34 to select port 204C, and (3) a signal on command line 410 for mux 54 to select port 122B. The conditions and actions for the transition from state 3 to state 1 are captioned in box 66 of FIG. 5B.

State machine 400 transitions from state 1 to state 4 on the conditions of state machine 400 receiving an active signal on terminal 404 and an active signal on terminal 408. To transition from state 1 to state 4, state machine 400 drives (1) a signal on command bus 402 for mux 14 to select port 114B, (2) a signal on command line 412 for mux 34 to select port 216B, and (3) a signal on command line 410 for mux 54 to select port 124B. The conditions and actions for the transition from state 1 to state 4 are captioned in box 75 of FIG. 5B.

State machine 400 transitions from state 4 to state 1 on the condition of state machine receiving an inactive signal on terminal 408. To transition from state 4 to state 1, state machine 400 drives (1) a signal on command bus 402 for mux 14 to select port 1116B, (2) a signal on command line 412 for mux 34 to select port 204C, and (3) a signal on command line 410 for mux 54 to select port 122B. The conditions and actions for the transition from state 4 to state 1 are captioned in box 76 of FIG. 5B.

Numerous modifications and adaptations of the embodiments described herein will be apparent to the skilled artisan in view of the disclosure. For example, state machine 400 may be configured differently to achieve the same or similar results. Specifically, FIG. 5B may be modified so that state 4 transitions to a state 5 on the condition of an inactive signal on terminal 408. To transition from state 4 to state 5, state machine 400 commands mux 14 to select port 104C as its input source. State 5 then transitions to state 1 on the condition of a rising clock edge on terminal 406. To transition from state 5 to state 1, state machine 400 commands (1) mux 14 to select port 116B, (2) mux 34 to select port 204C, and (3) mux 54 to select port 122B. Numerous such changes and modifications are encompassed by the attached claims.

APPENDIX A

```
/***********************************************************************
# CORE:      1394 Device Controller (1394DC)
# MODULE:    cycmon
# TOP MODULE:    llc (Link Layer Core)
# CLOCKS: Clk
# RESETS: Rst (Synchronous Active High)
# FLIPFLOP COUNT: 35
***********************************************************************/
'timescale 1 ns/1 ns
module cw6000_llccycmon(
                        phy_sclkp,
//                      cycmon_sclkp,
                        i_sresetp,
                        clk8kinp,
                        gscan_enablep,
                        i_aint_writep,
                        i_aint_addrp,
                        i_aint_wrdatap,
                        phyif_subact_gapp,
                        phyif_phy_resetp,
                        rx_cyclesynchn,
                        rx_cycletmrp,
                        tx_cycstrtdnn,
                        llcreg_cmstrp,
                        llcreg_cyctmrenp,
                        llcreg_offmatchp,
                        llcreg_extcycp,
                        cyc_reqn,
                        cyc_cycletmrp,
                        cyc_125usticp,
                        cyc_clk8koutp,
                        cyc_set_cyclostp,
                        cyc_set_cyctlp,
```

APPENDIX A-continued

```
                        cyc_set_cycsecp,
                        cyc_set_cycstp,
                        cyc_set_cycdnp,
                        cyc_set_cycpndp,
                        cyc_isophasep
                        );
//    Port Declarations
//    Clock and Reset Inputs
      input     phy_sclkp;          // Clock
      input     i_sresetp;          // System Reset
      input     clk8kinp;           // 8000 clk
      input     gscan_enablep;
//    Application Interface Inputs
      input i_aint_writep;
      input [7:13] i_aint_addrp;
      input [0:31] i_aint_wrdatap;
//    PHYIF inputs
      input phyif_subact_gapp,
            phyif_phy_resetp;
//    Transmitter Inputs
      input     tx_cycstrtdnn;  // Indicates that the Transmiter sent the cycle
//        Start packet
//    CSU Inputs
      input     llcreg_cmstrp;  // Indicates that current node is cycle master
      input     llcreg_cyctmrenp;  // Indicates that the cycle timer is enabled.
      input [0:11] llcreg_offmatchp;
      input     llcreg_extcycp;
//    Receiver Inputs
input         rx_cyclesynchn;// Cycle Start Recieved Indication
input [0:31] rx_cycletmrp; // Cycle Timer value Received
//    Outputs
// output         cycmon_sclkp;
output     cyc_reqn;   // Request to Transmitter to send the cycle start
output [0:31] cyc_cycletmrp;   // Cycle Timer Value
output     cyc_125usticp; // Indicates the 125 us reached?
output     cyc_set_cycsecp;  // Indicates the Second Count is incremented
output     cyc_set_cyclostp;   // Indicates the monitor detected a missing
                    // cycle start packet
output     cyc_clk8koutp;
output         cyc_set_cyctlp,//Set cycle too long intenrupt if cmstr & after
                        //transmitting cycle start a subaction gap or
                        //bus reset is not detected within 116 uS.
            cyc_set_cycstp,//Set Cycle start intenupt when cycle start
                        // packet has been sent or received
            cyc_set_cycdnp,//Set cycle done interrupt indicating arbitration
                        // gap has been detected after the cycle start
                        // packet. Indicates isochronous cycle is over
            cyc_set_cycpndp,//Set cycle pending interrupt when the cycle
                        //count is incremented
            cyc_isophasep; //asserted during isochronous phase
      parameter FF_DELAY = 1;
//    output register declarations
      reg   cyc_set_cyctlp,
            cyc_set_cycstp,
            cyc_set_cycdnp,
            cyc_isophasep;
reg       cyc_reqn;
wire [0:31] cyc_cycletmrp;
reg       cyc_set_cyclostp;
reg       cyc_set_cycpndp,
          cyc_125usticp;
reg       cyc_set_cycsecp;
//    Local Declarations
      wire [0:31] catchup_regp;
      reg [0:6] catchup_seccntp;
      reg [0:12] catchup_cyccntp;
      reg [0:11] catchup_cycoffp;
reg [0:11] Cycle_Offset;    // Cycle Offset register
reg [0:12] Cycle_Count;     // Cycle Count register
reg [0:6] Second_Count;     // Second Count register
      reg [0:12] cyctlcntp;
      reg   cyctlcntenp;
reg       offset_incr;    // Toggling flag to increment Offset
      wire     cyc_offset_carry; // Indication of 125us.
      wire     catch_off_carryp;
      wire     catch_cyccnt_carryp;
      wire cpuwritep,
//          forwardp,
            load_cycsyncp;
```

APPENDIX A-continued

```
    wire [0:11] cycoff_incrmtrp;
    wire [0:6] seccnt_incmtrp;
    wire [0:12] cyccnt_incrmtrp;
    reg clk8kin_synclp,
        clk8kin_syncedp,
        clk8kin_sync_dlyp,
        clk8kin_sync_dly2p;
    wire clk8k_risep;
    wire     clk8kmtchp;
    wire     cyc_clk8koutp;
    reg      clk8koutp;
wire         cyc_count_carry; // Indication of 1sec.
reg          exp_cycle_synch; // indicates that cycle synch event is pendg
reg          cyctmrcntenp;
`define CYC_MOD_8000    13'h1F3F // Cycle Count
`define CYC_MOD_127     7'h7F    // Second Count
`define CYC_TL_116      13'h16a8 //116us = 5800 cycles
/*cw6000_ckbufc cycgckbufi(.bclkp(cycmon_sclkp),
                                    .pclkp(phy_sclkp));
*/
//isochronous cycle detection
//always @ posedge cycmon_sclkp) begin
    always @ (posedge phy_sclkp) begin
        casez({i_sresetp,rx_cyclesynchn,tx_cycstrtdnn,phyif_subact_gapp,phyif_phy_resetp})//synopsys parallel_case
            5'b1????:cyc_isophasep <= #FF_DELAY 1'b0;
            5'b00??? : cyc_isophasep <= #FF_DELAY 1'b1;
            5'b0?0?? : cyc_isophasep <= #FF_DELAY 1'b1;
            5'b0111? : cyc_isophasep <= #FF_DELAY 1'b0;
            5'b011?1 : cyc_isophasep <= #FF_DELAY 1'b0;
            5'b01100 : cyc_isophasep <= #FF_DELAY cyc_isophasep;
            default : cyc_isophasep <= #FF_DELAY 1'bx;
        endcase // casez({i_sresetp,rx_cyclesynchn,tx_cycstrtdnn,phyif_arb_gapp,phyif_subact_gapp})
end // always @ (posedge phy_sclkp)
//      always @ (posedge cycmon_sclkp) begin
    always @ (posedge phy_sclkp) begin
        cyc_set_cycstp <= #FF_DELAY i_sresetp ? 1'b0:
                        (~rx_cyclesynchn | ~tx_cycstrtdnn);
/*      if(_sresetp) cyc_set_cycstp <= #FF_DELAY 1'b0;
        else if (~i_sresetp) cyc_set_cycstp <= #FF_DELAY ~rx_cyclesynchn | ~tx_cycstrtdnn;
        else cyc_set_cycstp <= #FF_DELAY 1'bx;
*/
    end // always @ (posedge phy_sclkp)
//      always @ (posedge cycmon_sclkp) begin
    always @ (posedge phy_sclkp) begin
        cyc_set_cycdnp <= #FF_DELAY i_sresetp ? 1'b0 : (cyc_isophasep &
                                                        (phyif_subact_gapp |
                                                         phyif_phy_resetp));
/*          if(_sresetp) cyc_set_cycdnp <= #FF_DELAY 1'b0;
        else if(~i_sresetp) cyc_set_cycdnp <= #FF_DELAY cyc_isophasep &
                                                        (phyif_subact_gapp |
                                                         phyif_phy_resetp);
        else cyc_set_cycdnp <= #FF_DELAY 1'bx;
*/  end // always @ (posedge phy_sclkp)
//Cycle too long detection
//cyc too long if 116 us has passed after cycle start was sent and
//arbitration reset gap or subaction gap has not been detected
//enable clock to cyctl counter only if
/*      cw6000_gckand2b cyctlpgck(.gclkp( cyctlpclkp),
                                .pclkp( phy_sclkp),
                                .gaten( ~i_sresetp |
                                        ~tx_cycstrtdnn |
                                        cyctlcntenp)),
                                .gscan_enablep( gscan_enablep)
                                );
*/
//      always @ (posedge cycmon_sclkp) begin
    always @ (posedge phy_sclkp) begin
        if (i_sresetp) cyc_set_cyctlp <= #FF_DELAY 1'b0;
        else if (~i_sresetp) cyc_set_cyctlp <= #FF_DELAY ~(|cyctlcntp[0:12]);
        else cyc_set_cyctlp <= #FF_DELAY 1'bx;
    end // always @ (posedge phy_sclkp)
/*      always @ (posedge cyctlpclkp) begin
        casez({i_sresetp,tx_cycstrtdnn})//synopsys parallel_case
            2'b1? : cyctlcntp[0:12] <= #FF_DELAY `CYC_TL_116;//116 us
            2'b00 : cyctlcntp[0:12] <= #FF_DELAY `CYC_TL_116;//116 us
            2'b01 : cyctlcntp[0:12] <= #FF_DELAY cyctlcntp[0:12] - 1'b1;
            default: cyctlcntp[0:12] <= #FF_DELAY 13'hxxx;
        endcase // casez({i_sresetp,txcycstrtdnn})
    end // always @ (posedge cyctlpclkp)
```

APPENDIX A-continued

```verilog
*/
    always @ (posedge phy_sclkp) begin
        casez({i_sresetp,tx_cycstrtdnn,cyctlcntenp})//synopsys parallel_case
            3'b1?? : cyctlcntp[0:12] <= #FF_DELAY 'CYC_TL_116;//116 us
            3'b00? : cyctlcntp[0:12] <= #FF_DELAY 'CYC_TL_116;//116 us
            3'b011 : cyctlcntp[0:12] <= #FF_DELAY cyctlcntp[0:12] - 1'b1;
            3'b010 : cyctlcntp[0:12] <= #FF_DELAY cyctlcntp[0:12];
            default: cyctlcntp[0:12] <= #FF_DELAY 13'hxxx;
        endcase // casez({i_sresetp,txcycstrtdnn})
    end // always @ (posedge cyctlpclkp)
//  always @ (posedge cycmon_sclkp) begin
    always @ (posedge phy_sclkp) begin
        casez ({i_sresetp,tx_cycstrtdnn,phyif_phy_resetp,
                phyif_subact_gapp,~(|cyctlcntp[0:12]),llcreg_cyctmrenp})//synopsys parallel_case
            6'b1????? : cyctlcntenp <= #FF_DELAY 1'b0;
            6'b0????0 : cyctlcntenp <= #FF_DELAY 1'b0;
            6'b00??ature1 : cyctlcntenp <=#FF_DELAY 1'b1;
            6'b00???1 : cyctlcntenp <=#FF_DELAY 1'b1;
            6'b011??1 : cyctlcntenp <=#FF_DELAY 1'b0;
            6'b01?1?1 : cyctlcntenp <=#FF_DELAY 1'b0;
            6'b01??11 : cyctlcntenp <=#FF_DELAY 1'b0;
            6'b010001 : cyctlcntenp <=#FF_DELAY cyctlcntenp;
            default: cyctlcntenp <=#FF_DELAY 1'bx;
        endcase // casez({i_sresetp,tx_cycstrtdnn,phyif_arb_gapp,phyif_subact_gapp})
    end // always @ (posedge phy_sclkp)
//      Output cycle timer value generation
    assign cyc_cycletmrp = {Second_Count, Cycle_Count, Cycle_Offset};
    assign catchup_regp = {catchup_seccntp, catchup_cyccntp, catchup_cycoffp};
//      synopsys sync_set_reset "i_sresetp"
//      Generation of offset incrementer strobe by toggling
//      this flag every clock. This will control the cycle offset
//      incrementing every other clock
//  always @ (posedge cycmon_sclkp) begin
    always @ (posedge phy_sclkp) begin
        casez({i_sresetp,llcreg_cyctmrenp})//synopsys parallel_case
            2'b1? : offset_incr <=#FF_DELAY 1'b0;
            2'b01 : offset_incr <=#FF_DELAY ~offset_incr;
            2'b00 : offset_incr <=#FF DELAY 1'b0;
            default : offset_incr <=#FF_DELAY 1'bx;
        endcase // casez(i_sresetp,llcreg_cyctmrenp)
/*      if(i_sresetp) offset_incr <=#FF_DELAY 1'b0;
        else if (~i_sresetp & llcreg_cyctmrenp) offset_incr <=#FF_DELAY ~offset_incr;
        else if(~i_sresetp & llcreg_cyctmrenp) offset_incr <=#FF_DELAY 1'b0;
        else offset_incr <=#FF_DELAY 1'bx;
*/
    end
//toggle clk8kout when cycle_offset matches 1/2 of offmatchp value and
//when cycle_offset matches offmatch value
/*bug50*/
    assign clk8kmtchp = ((Cycle_Offset[0:11] == {1'b0,llcreg_offmatchp[0:10]})
                        & offset_incr) | cyc_offset_carry;
/*      assign clk8kmtchp = ((cycoff_incrmtrp[0:11] ==
    {1'b0,llcreg_offmatchp[0:10]})
    & offset_incr)|
    (~cyctmrcntenp ? catch_off_carryp : cyc_offset_carry);
*/
//      always @ (posedge cycmon_sclkp) begin
    always @ (posedge phy_sclkp) begin
/*bug58           casez({i_sresetp,clk8kmtchp})
            2'b1? : clk8koutp <=#FF_DELAY 1'b0;
            2'b01 : clk8koutp <= #FF_DELAY ~clk8koutp;
            2'b00 : clk8koutp <=#FF_DELAY clk8koutp;
*/
        casez({i_sresetp,clk8kmtchp,cyctmrcntenp})
            3'b1?? : clk8koutp <=#FF_DELAY 1'b0;
            3'b011 : clk8koutp <=#FF_DELAY ~clk8koutp;
            3'b001 : clk8koutp <=#FF_DELAY clk8koutp;
            3'b0?0 : clk8koutp <=#FF_DELAY clk8koutp;
            default : clk8koutp <=#FF_DELAY 1'bx;
        endcase // casez({i_sresetp,clk8kmtchp})
    end // always @ (posedge phy_sclkp)
    assign cyc_clk8koutp = (llcreg_cmstrp & llcreg_extcycp) ? clk8kin_syncedp:
                                                              clk8koutp;
    assign cyc_offset_carry = ~(llcreg_cmstrp & llcreg_extcycp) ?
                                //cmstr is not set or extcyc is not set
                                (cyctmrcntenp &
                                (Cycle_Offset ==llcreg_offmatchp) & offset_incr)
                                :
                                //extcyc set and cmstr set
                                ctk8k_risep & offset_incr;
```

APPENDIX A-continued

```
            assign catch_off_carryp = (llcreg_cmstrp & llcreg_extcycp) ?
                                      ((catchup_cycoffp == llcreg___offmatchp) &
                                      offset_incr)
                                      clk8k_risep & offset_incr;
//          always @ (posedge cycmon_sclkp)
            always @ (posedge phy_sclkp)
                casez({i_sresetp,llcreg_cmstrp,
                        (~rx_cyclesynchn & (cyc_cycletmrp[0:31] > rx_cycletmrp[0:31])),
//bug52         (~cyctmrcntenp & (cyc_cycletmrp[0:31] == catchup_regp[0:31]))}
                        ((~cyctmrcntenp & (cyc_cycletmrp[0:31] == catchup_regp[0:31])) |
                        cpuwritep)
                        }
                    )//synopsys parallel_case
                4'b1??? : cyctmrcntenp <= #FF_DELAY 1'b1;
                4'b01?? : cyctmrcntenp <=#FF_DELAY 1'b1;
                4'b001? : cyctmrcntenp <= #FF_DELAY 1'b0;
                4'b0001 : cyctmrcntenp <= #FF_DELAY 1'b1;
                4'b0000 : cyctmrcntenp <= #FF_DELAY cyctmrcntenp;
                default : cyctmrcntenp <= #FF_DELAY 1'bx;
            endcase // casez({i_sresetp, ...
            assign cpuwritep = i_aint_writep & (i_aint_addrp[7:13] == 7'h01);
//          assign forwardp = (cyc_cycletmrp[0:31] >= catchup_regp[0:31]);
            //(assign forwardp = (cyc_cycletmrp[0:31] < rx_cycletmrp[0:31]);
            assign load_cycsyncp = ~rx_cyclesynchn &
                                      (cyc_cycletmrp[0:31] <= rx_cycletmrp[0:31]);
            assign cycoff_incrmtrp[0:11] = (~cyctmrcntenp ?
                                      catchup_cycofp[0:11]:
                                      Cycle_Offset[0:11]) + 1'b1;
/*          cw6000_gckand2c catchupgck(.gclkp( catchupclkp),
                                      .pclkp( phy_sclkp),
                                      .gaten( ~i_sresetp |
                                           ((~rx_cyclesynchn |
                                           (~cyctmrcntenp & offset_incr)) &
                                           llcreg_cyctmrenp)) ),
                                      .gscan_enablep( gscan_enablep )
                                      );
*/
/*          always @ (posedge catchupclkp) begin
                casez({i_sresetp,rx_cyclesynchn,catch_off_carryp})//synopsys parallel_case
                    3'b1?? : catchup_cycoffp[0:11] <= #FF_DELAY 12'h000;
                    3'b00? : catchup_cycoffp[0:11] <= #FF_DELAY rx_cycletmtp[20:31];
                    3'b010 : catchup_cycoffp[0:11] <= #FF_DELAY cycoff_incrmtrp[0:11];
                    3'b011 : catchup_cycoffp[0:11] <= #FF_DELAY 12'h000;//wrap
                    default : catchup_cycoffp[0:11] <= #FF_DELAY 12'hxxx;
                endcase // casez({i_sresetp,cpuwritep,rx_cyclesynchn,forwardp})
            end // always @ (posedge catchupclkp)
*/
            always @ (posedge phy_sclkp) begin
                casez({i_sresetp,rx_cyclesynchn,catch_off_carryp,cyctmrcntenp,offset_incr,llcreg_cyctmrenp})//synopsys parallel_case
                    6'b1????? : catchup_cycoffp[0:11] <= #FF_DELAY 12'h000;
                    6'b0????0 : catchup_cycoffp[0:11] <= #FF_DELAY catchup_cycoffp[0:11];
                    6'b00??1 : catchup_cycoffp[0:11] <= #FF_DELAY rx_cycletmrp[20:31];
                    6'b010011 : catchup_cycoffp[0:11] <= #FF_DELAY cycoff_incrmtrp[0:11];
                    6'b011011 : catchup_cycoffp[0:11] <= #FF_DELAY 12'h000;//wrap
                    6'b01??01 : catchup_cycoffp[0:11] <= #FF_DELAY catchup_cycoffp[0:11];
                    6'b01?111 : catchup_cycoffp[0:11] <= #FF_DELAY catchup_cycoffp[0:11];
                    default: catchup_cycoffp[0:11] <= #FF_DELAY 12'hxxx;
                endcase // casez({i_sresetp,cpuwritep,rx_cyclesynchn,forwardp})
            end // always @ (posedge catchupclkp)
/*          always @ (posedge catchupclkp) begin
            casez({i_sresetp,rx_cyclesynchn,catch_cyccnt_carryp,
                    catch_off_carryp})//synopsys parallel_case
                4'b1??? : catchup_cyccntp[0:12] <= #FF_DELAY 13'h0000;
                4'b00?? : catchup_cyccntp[0:12] <= #FF_DELAY rx_cycletmrp[7:19];
                4'b0100 : catchup_cyccntp[0:12] <= #FF_DELAY catchup_cyccntp[0:12];
                4'b0101 : catchup_cyccntp[0:12] <= #FF_DELAY cyccnt_incrmtrp[0:12];
                4'b011? : catchup_cyccntp[0:12] <= #FF_DELAY 13'h0000;//wrap
                default: catchup_cyccntp[0:12] <= #FF_DELAY 13'hxxxx;
            endcase // casez({i_sresetp,cpuwritep,rx_cyclesynchn,forwardp})
            end // always @ (posedge catchupclkp)
*/
            always @ (posedge phy_sclkp) begin
                casez({i_resetp,rx_cyclesynchn,catch_cyccnt_carryp,
                        catch_off_carryp,llcreg_cyctmrenp})//synopsys parallel_case
                    5'b1???? : catchup_cyccntp[0:12] <= #FF_DELAY 13'h0000;
                    5'b0???0 : catchup_cyccntp[0:12] <= #FF_DELAY catchup_cyccntp[0:12];
                    5'b00??1 : catchup_cyccntp[0:12] <= #FF_DELAY rx_cycletmrp[7:19];
                    5'b01001 : catchup_cyccntp[0:12] <= #FF_DELAY catchup_cyccntp[0:12];
                    5'b01011 : catchup_cyccntp[0:12] <= #FF_DELAY cyccnt_incrmtrp[0:12];
```

APPENDIX A-continued

```
                5'b011?1 : catchup__cyccntp[0:12] <= #FF__DELAY 13'h0000;//wrap
                default: catchup__cyccntp[0:12] <= #FF__DELAY 13'hxxxx;
        endcase // casez({i_sresetp,cpuwritep,rx__cyclesynchn,forwardp})
    end // always @ (posedge catchupclkp)
    //    Cycle Offset Implementation
/*      cw6000_gckand2c cyctmrgck(.gclkp( cyctmrclkp),
                                  .pclkp( phy__sctkp ),
                                  .gaten( ~(i_sresetp |
                                          ((load__cycsyncp | cpuwritep |
                                              (cyctmrcntenp & offset__incr))
                                          & llcreg__cyctmrenp)) ),
                                  .gscan__enablep( gscan__enablep)
                                  );
*/
/*      always __(posedge cyctrnrclkp) begin
            casez({i_sresetp,load__cycsyncp,cpuwritep,cyc__offset__carry})//synopsys parallel__case
                4'b1??? : Cycle__Offset <= #FF__DELAY 12'h000;
                4'b010? : Cycle__Offset <= #FF__DELAY ___cycletmrp[20:31]; //cycle synch write
                4'b0?1? : Cycle__Offset <= #FF__DELAY i_aint__wrdatap[20:31]; //cpu write has priority
               4'b0001 : Cycle__Offset <= #FF__DELAY 12'h000;
                4'b0000 : Cycle__Offset <= #FF__DELAY cycoff__incrmtrp[0:11];
                default : Cycle__OffSet <= #FF__DELAY 12'hxxx;
            endcase // casez({i_sresetp,load__cycsyncp,cpuwritep__cyc__offset__carry})
        end // always @ (posedge phy__sclkp)
*/
        always __(posedge phy__sclkp) begin
            casez({i_sresetp,load__cycsyncp,cpuwritep,cyc__offset__carry,cyctmrcntemp,offset__incr,llcreg__cyctmrenp})//synopsys
parallel__case
                7'b1?????? : Cycle__Offset <= #FF__DELAY 12'h000;
                7'b0?????0 : Cycle__Offset <= #FF__DELAY Cycle__Offset;
                7'b010???1 : Cycle__Offset <= #FF__DELAY rx__cycletmrp[20:31]; //cycle synch write
                7'b0?1???1 : Cycle__Offset <= #FF DELAY Laint__wrdatap[20:31]; //cpu write has priority
               7'b0001111 : Cycle__Offset <= #FF__DELAY 12'h000;
                7'b0000111 : Cycle__Offset <= #FF__DELAY cycoff__incrmtrp[0:11];
                7'b000?0?1 : Cycle__Offset <= #FF__DELAY Cycle__Offset;
                7'b000?101 : Cycle__Offset <= #FF__DELAY Cycle__Offset;
                default : Cycle__Offset <= #FF__DELAY 12'hxxx;
            endcase // casez({i_sresetp,load__cycsyncp,cpuwritep,cyc__offset__carry})
        end // always @ (posedge phy__sclkp)
    //    Generation of cyc__125usticp for updating Retry Timers etc.
//        always @ (posedge cycmon__sclkp) begin
        always __(posedge phy__sclkp) begin
            if(i_sresetp) cyc__set__cycpndp <= #FF__DELAY 1'b0;
            eise if(~i_resetp) cyc__set__cycpndp <= #FF__DELAY cyctmrcntenp ? cyc__offset__carry:
                                                       catch__off__carryp;
            else cyc__set__cycpndp <= #FF__DELAY 1'bx;
        end
//        assign cyc__set__cycpndp = cyc__125usticp;
//bug81 cyc__125usticp should assert when we receive a cycle start pkt
//and the cycle count is greater than ours (has just incremented)
        always @ (posedge phy__sclkp) begin
            if(i_sresetp) cyc__125usticp <= #FF__DELAY 1'b0;
            else if(~i_sresetp) cyc__125usticp <= #FF__DELAY cyctmrcntenp?
                                                        (cyc__offset__carry |
                                                        load__cycsyncp &
                                                        (Cycle__Count[0:12] !=
                                                        rx__cycletmrp[7:19])):
                                                        catch__off__carryp;
            else cyc__125usticp <= #FF__DELAY 1'bx;
        end
    //    clk8kinp synchronization and rise edge detection
//        always @ (posedge cycmon__sclkp) begin
        always @ (posedge phy__sclkp) begin
            clk8kin__synclp <= #FF__DELAY clk8kinp;
            clk8kin__syncedp <= #FF__DELAY clk8kin__synclp;
            clk8kin__sync__dlyp <= #FF__DELAY clk8kin__syncedp;
            clk8kin__sync__dly2p <= #FF__DELAY clk8kin__sync__dlyp;
        end // always @ (posedge phy__sclkp)
    assign clk8k__risep = clk8kin__syncedp & ~clk8kin__sync__dly2p;
    //    Carry from Cycle Count generation
    assign cyc__count__carry = (Cycle__Count == 'CYC__MOD__8000) & cyc__offset__carry;
    assign catch__cyccnt__carryp = ~(catchup__cyccntp == 'CYC__MOD__8000) &
                                        catch__off__carryp;
    assign cyccnt__incrmtrp[0:12] = (cyctmrcntenp ?
                                          catchup__cyccntp[0:12]:
                                          Cycle__Count[0:12]) + 1'b1;
```

APPENDIX A-continued

```
      //   Cycle Count Implementation
/*         always @ (posedge cyctmrclkp) begin
               casez({i_sresetp,load_cycsyncp,cpuwritep,cyc_count_carry,
                       cyc_offset_carry))//synopsys parallel_case
                   5'b1???? : Cycle_Count <= #FF_DELAY 13'h0000;
                   5'b010?? : Cycle_Count <= #FF_DELAY rx_cycletmrp[7:19]; //cycle synch write
                   5'b0?1?? : Cycle_Count <= #FF_DELAY i_aint_wrdatap[7:19]; //cpu write has priority
                   5'b0001? : Cycle_Count <= #FF_DELAY 13'h0000;
                   5'b00000 : Cycle_Count <= #FF_DELAY Cycle_Count;
                   5'b00001 : Cycle_Count <= #FF_DELAY cyccnt_incrmtrp[0:12];
                   default : Cycle_Count <= #FF_DELAY 13'hxxxx;
               endcase // casez({i_sresetp,load_cycsyncp,cpuwritep,forwardp,cyc_count_carry})
           end // always @ (posedge cyctmrclkp)
*/
           always @ (posedge phy_sclkp) begin
               casez({i_sresetp,load_cycsyncp,cpuwritep,cyc_count_carry,
                       cyc_offset_carry,llcreg_cyctmrenp})//synopsys parallel_case
                   6'b1????? : Cycle_Count <= #FF_DELAY 13'h0000;
//bug 2/11/1999    6'b1????0 : Cycle_Count <=   #FF_DELAY Cycle_Count
                   6'b0????0 : Cycle_Count <= #FF_DELAY Cycle_Count;
                   6'b010??1 : Cycle_Count <= #FF_DELAY rx_cycletmrp[7:19]; //cycle synch write
                   6'b0?1??1 : Cycle_Count <= #FF_DELAY i_aint_wrdatap[7:19]; //cpu write has priority
                   6'b0001?1 : Cycle_Count <= #FF_DELAY 13'h0000;
                   6'b000001 : Cycle_Count <= #FF_DELAY Cycle_Count;
                   6'b000011 : Cycle_Count <= #FF_DELAY cyccnt_incrmtrp[0:12];
                   default : Cycle_Count <= #FF_DELAY 13'hxxxx;
               endcase // casez({_sresetp,load_cycsyncp,cpuwritep,forwardp,cyc_count_carry})
           end // always @ (posedge cyctmrclkp)
       //
       //   Generation of cyc_set_cycsecp for CSU
//         always @ (posedge cycmon_sclkp) begin
           always @ (posedge phy_sclkp) begin
               cyc_set_cycsecp <= #FF_DELAY i_sresetp ? 1'b0:
//bug51             (cyctmrcntenp ? cyc_coun(_carry :catch_cyccnt_carryp;*/
                                    (cyc_count_carry |
                                    (load_cycsyncp &
                                     Second_Count[0:6] != rx_cyctetmrp[0:6]));
           end
           assign seccnt_incrmtrp[0:6] = (~cyctmrcntenp ?
                                               catchup_seccntp[0:6]:
                                               Second_Count[0:6]) + 1'b1;
/*         always @ (posedge catchupclkp) begin
               casez({i_sresetp,rx_cyclesynchn,catch_cyccnt_carryp})//synopsys parallel_case
                   3'b1?? : catchup_seccntp[0:6] <= #FF_DELAY 7'h00;
                   3'b00? : catchup_seccntp[0:6] <= #FF_DELAY rx_cycletmrp[0:6];
                   3'b010 : catchup_seccntp[0:6] <= #FF_DELAY catchup_seccntp[0:6];
                   3'b011 : catchup_seccntp[0:6] <= #FF_DELAY seccnt_incrmtrp[0:6];
                   default: catchup_seccntp[0:6] <= #FF_DELAY 7'hxx;
               endcase // casez({i_sresetp,cpuwritep,rx_cyctesynchn,forwardp})
           end // always @ (posedge catchupclkp)
*/
           always @ (posedge phy_sclkp) begin
               casez({i_sresetp,rx_cyclesynchn,catch_cyccnt_carry,llcreg_cyctmrenp})//synopsys parallel_case
                   4'b1???: catchup_seccntp[0:6] <= #FF_DELAY 7'h00;
                   4'b0??0 : catchup_seccntp[0:6] <= #FF_DELAY catchup_seccntp[0:6];
                   4'b00?1 : catchup_seccntp[0:6] <= #FF_DELAY rx_cycletmrp[0:6];
                   4'b0101 : catchup_seccntp[0:6] <= #FF_DELAY catchup_seccntp[0:6];
                   4'b0111 : catchup_seccntp[0:6] <= #FF_DELAY seccnt_incmrntrp[0:6];
                   default : catchupseccntp[0:6] <= #FF_DELAY 7'hxx;
               endcase // casez({i_sresetp,cpuwritep,rx_cyclesynchn,forwardp})
           end // always @ (posedge catchupclkp)
       //   Second Count Implementation
/*         always @ (posedge cyctmrclkp) begin
               casez({i_sresetp,load_cycsyncp,cpuwritep,cyc_count_carry})//synopsys parallel_case
                   4'b1??? : Second_Count <= #FF_DELAY 7'h00;
                   4'b010? : Second_Count <= #FF_DELAY rx_cycletmrp[0:6]; //cycle synch write
                   4'b0?1? : Second_Count <= #FF_DELAY i_aint_wrdatap[0:6]; //cpu write has priority
                   4'b0000 : Second_Count <= #FF_DELAY Second_Count
                   4'b0001 : Second_Count <= #FF_DELAY seccnt_incrmtrp[0:6];
                   default: Second_Count <= #FF_DELAY 7'hxx;
               endcase // casez({i_sresetp,load_cycsyncp,cpuwritep,forwardp,cyc_count_carry})
           end // always @ (posedge cyctmrclkp)
*/
           always @ (posedge phy_sctkp) begin
               casez({i_sresetp,load_cycsyncp,cpuwritep,cyc_count_carry,llcreg_cyctmrenp})//synopsys parallel_case
                   5'1???? : Second_Count <= #FF_DELAY 7'h00;
                   5'b0???0 : Second_Count <= #FF_DELAY Second_Count
                   5'b010?1 : Second_Count <= #FF_DELAY rx_cycletmrp[0:6]; //cycle synch write
                   5'b0?1?1 : Second_Count <= #FF_DELAY Laint_wrdatap[0:6]; //cpu write has priority
```

APPENDIX A-continued

```
            5'b00001 : Second_Count <= #FF_DELAY Second_Count
            5'b00011 : Second_Count <= #FF_DELAY seccnt_incrmtrp[0:6];
            default: Second_Count <= #FF_DELAY 7'hxx;
        endcase // casez({i_sresetp,load_cycsyncp,cpuwritep,forwardp,cyc_count_carry})
    end // always @ (posedge cyctmrclkp)
//    Generation of Cycle Request Signal to Transmitter for generating
//    Cycle Start Packet
//       always @ (posedge cycmon_sclkp) begin
      always @ (posedge phy_sclkp) begin
        casez({i_sresetp,tx_cycstrtdnn,llcreg_cmstrp,llcreg_cyctmrenp,
               cyc_offset_carry}) //synopsys parallel_case
            5'b1???? :cyc_reqn <= #FF_DELAY 1'b1;
            5'b00??? : cyc_reqn <= #FF_DELAY 1'b1;
            5'b01111 : cyc_reqn <- #FF_DELAY 1'b0;
            5'b010?? : cyc_reqn <= #FF_DELAY cyc_reqn;
            5'b01?0? : cyc_reqn <= #FF_DELAY cyc_reqn;
            5'b01??0 : cyc_reqn <= #FF_DELAY cyc_reqn;
            default : cyc_reqn <= #FF_DELAY 1'bx;
        endcase // casez({i_resetp,tx_cycstrtdnn,llcreg_cmstrp,llcrge_cyctmrenp, . . .
    end // always @ (posedge phy_sclkp)
//    Generation of Cycle Lost Signal is valid only for cycle slaves
//       always @ (posedge cycmon_sclkp) begin
      always @ (posedge phy_sclkp) begin
        casez({i_sresetp,cyc_set_cyclostp,exp_cycle_synch,
               cyc_set_cycpnd/*cyc_*//*cyc_offset_carry*/})//synopsys parallel_case
            4'b1??? : cyc_set_cyclostp <= #FF_DELAY 1'b0;
            4'b01?? : cyc_set_cyctostp <= #FF_DELAY 1'b0;
            4'b0011 : cyc_set_cyclostp <= #FF_DELAY 1'b1;
            4'b000? : cyc_set_cyclostp <= #FF_DELAY cyc_set_cyclostp;
            4'b00?0 : cyc_set_cyclostp <= #FF_DELAY cyc_set_cyclostp;
            default: cyc_set_cyclostp <= #FF_DELAY 1'bx;
        endcase // casez({i_sresetp,cyc_set_cyclostp,exp_cycle_synch,cyc_offset_carry})
    end // always @ (posedge phy_sclkp)
//    Generation of Expected Cycle Synch
            always _(posedge phy_clkp)
              begin
                     casez({i_sresetp, rx_cyclesynchn, cyc_set_cycpndp,
                            cyc_set_cyclostp} | 4'h0)
                        4'b1??? : exp_cycle_synch <= #FF_DELAY 1'b0;
                        4'b00?? : exp_cycle_synch <= #FF_DELAY 1'b0;
                        4'b0110 : exp_cycle_synch <= #FF_DELAY 1'b1;
                        4b0100 : exp_cycle_synch <= #FF_DELAY exp_cycle_synch;
                        4'b01?1 : exp_cycle_synch <= #FF_DELAY 1'b0;
                        default : exp_cycle_synch <= #FF_DELAY 1'bx;
                     endcase
              end
endmodule
```

What is claimed is:

1. A method for synchronizing time signals, the method comprising:

incrementing a first time signal;

clocking at least a portion of a circuit using the first time signal;

freezing the first time signal to prevent repetition of the incrementing if the first time signal is greater than a second time signal;

repeatedly incrementing the second time signal if the first time signal is greater than the second time signal;

comparing the second time signal to the frozen first time signal after each increment of the second time signal; and unfreezing the frozen first time signal to repeat the incrementing of the first time signal if the second time signal is greater than or equal to the frozen first time signal.

2. The method of claim 1, wherein said second time signal is derived from a third time signal received from an external circuit.

3. The method of claim 2, further comprising:

setting the first time signal equal to the third time signal and incrementing the first time signal if the first time signal is less than the second time signal.

4. The method of claim 2, further comprising:

setting the first time signal equal to the third time signal and incrementing the first time signal if the first time signal is equal to the second time signal.

5. The method of claim 2, further comprising:

incrementing the second time signal once, setting the first time signal equal to the second time signal, and incrementing the first time signal if the first time signal is less than the second time signal.

6. The method of claim 5, further comprising:

incrementing the second time signal once, setting the first time signal equal to the second time signal, and incrementing the first time signal if the first time signal is equal to the second time signal.

7. The method of claim 5, wherein the incrementing of the first time signal and the second time signal is performed by a single incrementor.

8. A circuit for synchronizing time signals, comprising:

a first timer having (i) a first output bus and (ii) a control port, wherein the first timer repetitively increments a first time signal and drives the first time signal on the first output bus in response to a first control signal on the control port;

a second timer having (i) a second output bus and (ii) a first control terminal, wherein the second timer drives a second time signal on the second output bus in response to a second control signal on the first control terminal; and a comparator comprising (i) a comparator output line, (ii) a first comparator port coupled to the first output bus and (iii) a second comparator port coupled to the second output bus, wherein (a) the comparator drives a comparator signal active on the comparator output line if the signal on the first output bus is greater than the signal on the second output bus, (b) the first timer freezes the first time signal to prevent repetitive incrementing of the first time signal in response to a third control signal on the control port, and (c) the first timer unfreezes the frozen first time signal to repeat the incrementing of the first time signal if the second time signal is greater than or equal to the frozen first time signal.

9. The circuit of claim 8, wherein (i) the first timer further comprises an input port and (ii) the first timer saves a third time signal received on the input port as the first time signal in response to a third control signal on the control port and repetitively increments and drives the first time signal on the first output bus in response to the first control signal on the control port.

10. The circuit of claim 8, wherein:

the second timer repetitively increments the second time signal and drives the second time signal on the second output bus in response to a fourth control signal on the first control terminal.

11. The circuit of claim 10, wherein:

the first timer saves the second time signal as the first time signal in response to said third control signal on the control port and repetitively increments the first time signal aid drives the first time signal on the first output bus in response to the first control signal on the control port.

12. The circuit of claim 8, wherein the first timer further comprises:

a first selective register comprising (i) the first output bus, (ii) a first input port, and (iii) a second input port coupled to the first output bus;

a first incrementor comprising a first incrementor bus coupled to the first input port; and a first incrementor port coupled to the first output bus.

13. The circuit of claim 12, wherein the second timer further comprises:

a second selective register comprising (i) the second output bus and (ii) a third input port; and a second incrementor comprising (i) a second incrementor bus coupled to the third input port and (ii) a second incrementor port coupled to the second output bus.

14. The circuit of claim 8, wherein the first timer further comprises:

a first selective register comprising (i) the first output bus, (ii) a first input port, and (iii) a second input port coupled to the first output bus; and a selective incrementor comprising (i) an incrementor bus coupled to the first input port, (ii) a first incrementor port coupled to the first output bus, (iii) a second incrementor port coupled to the second output bus, and (iv) a second control terminal, wherein the selective incrementor selects an input source among the first incrementor port and the second incrementor port in response to a control signal on the second control terminal.

15. The circuit of claim 14, wherein the second timer further comprises:

the selective incrementor; and a second selective register comprising (i) the second output bus and (ii) a third input port coupled to the incrementor bus.

16. The circuit of claim 13, wherein the first selective register further comprises:

a first time store comprising (i) the first output bus and (ii) a first time store port;

a first multiplexer comprising (i) a first multiplexer port and (ii) a second multiplexer port coupled to the first output bus; and a first multiplexer bus coupled to the first time store port.

17. The circuit of claim 16, wherein the selective incrementor further comprises:

an incrementor comprising (i) an incrementor bus coupled to the first multiplexer port and (ii) an incrementor port; and a second multiplexer comprising (i) a third multiplexer port coupled to the first output bus, (ii) a fourth incrementor port coupled to the second output bus and (iii) a second multiplexer bus coupled to the incrementor port.

18. The circuit of claim 17, wherein the second selective register further comprises:

a second time store comprising (i) the second output bus and (ii) a second time store port; and a third multiplexer comprising (i) a fifth multiplexer port coupled to the incrementor bus and (ii) a third multiplexer bus coupled to the second time store port.

19. The circuit of claim 16, further comprising an application logic, wherein the application logic comprises an input and output circuit I/O coupled to the first output bus.

20. The circuit of claim 16, further comprising an application logic, wherein the application logic comprises a packet generator coupled to the first output bus.

21. The circuit of claim 16, further comprising an application logic, wherein the application logic comprises a packet parser coupled to the first output bus.

22. The circuit of claim 16, further comprising a packet transmitter and a packet receiver, wherein the packet transmitter is coupled to the first output bus.

23. The circuit of claim 16, further comprising a physical layer circuit (PHY), wherein the physical layer circuit transmits a clock signal to the first timer and the second timer.

* * * * *